(12) United States Patent
Steger

(10) Patent No.: US 10,743,970 B2
(45) Date of Patent: Aug. 18, 2020

(54) PROCESSING MACHINE FOR THE PRODUCTION OF A DENTAL WORKPIECE

(71) Applicant: Heinrich Steger, Bruneck (IT)

(72) Inventor: Heinrich Steger, Bruneck (IT)

( * ) Notice: Subject to any disclaimer, the term of this patent is extended or adjusted under 35 U.S.C. 154(b) by 0 days.

(21) Appl. No.: 16/004,944

(22) Filed: Jun. 11, 2018

(65) Prior Publication Data

US 2018/0353271 A1   Dec. 13, 2018

(30) Foreign Application Priority Data

Jun. 13, 2017   (AT) .................................. 50494/2017

(51) Int. Cl.
| | | |
|---|---|---|
| *A61C 13/00* | (2006.01) | |
| *B23Q 11/08* | (2006.01) | |
| *B23Q 39/02* | (2006.01) | |
| *B23Q 11/10* | (2006.01) | |

(52) U.S. Cl.
CPC ...... *A61C 13/0022* (2013.01); *A61C 13/0004* (2013.01); *A61C 13/0006* (2013.01); *B23Q 11/08* (2013.01); *B23Q 11/0891* (2013.01); *B23Q 39/028* (2013.01); *B23Q 11/085* (2013.01); *B23Q 11/10* (2013.01)

(58) Field of Classification Search
CPC ............ A61C 13/0022; A61C 13/0006; A16C 13/0004; B23Q 11/08; B23Q 11/0891; B23Q 39/028
See application file for complete search history.

(56) References Cited

U.S. PATENT DOCUMENTS

| | | | | |
|---|---|---|---|---|
| 4,656,995 A | * | 4/1987 | Merwin | ............. A61B 17/1635 220/377 |
| 5,435,675 A | * | 7/1995 | Rutschle | ................... B23Q 1/66 29/DIG. 56 |
| 5,607,269 A | | 3/1997 | Dowd et al. | |
| 2003/0053875 A1 | | 3/2003 | Pasquetto | |

(Continued)

FOREIGN PATENT DOCUMENTS

| | | |
|---|---|---|
| CH | 701 445 | 1/2011 |
| DE | 199 29 695 | 3/2001 |

(Continued)

OTHER PUBLICATIONS

Search Report dated Mar. 15, 2019 in corresponding European Patent Application No. 18176784 with English translation.

*Primary Examiner* — Alan Snyder
(74) *Attorney, Agent, or Firm* — Wenderoth, Lind & Ponack, L.L.P.

(57) ABSTRACT

A processing machine for the production of a dental workpiece from a blank, includes a housing in which a first chamber and a second chamber are arranged, in which the second chamber is separate from the first chamber. A first holding device for holding a blank is provided, and the first holding device is arranged in the first chamber and is movable relative to the housing. A second holding device for holding a blank is provided, and the second holding device is arranged in the second chamber and is movable relative to the housing. A processing device is movable relative to the housing, and a blank held in the first holding device and a blank held in the second holding device can be processed by the processing device.

20 Claims, 24 Drawing Sheets

(56) References Cited

U.S. PATENT DOCUMENTS

| | | | |
|---|---|---|---|
| 2003/0121362 A1* | 7/2003 | Goellner | B23Q 11/0816 |
| | | | 74/608 |
| 2006/0133903 A1 | 6/2006 | Shiraishi et al. | |
| 2011/0085863 A1 | 4/2011 | Shill | |
| 2016/0206410 A1* | 7/2016 | Steger | A61C 13/0006 |
| 2016/0317258 A1* | 11/2016 | Steger | A61C 13/0022 |

FOREIGN PATENT DOCUMENTS

| | | |
|---|---|---|
| DE | 10 2006 023 6 | 11/2007 |
| DE | 102006023673 A1 | 11/2007 |
| DE | 102006023673 B4 | 11/2007 |
| DE | 20 2011 103 2 | 12/2011 |
| EP | 2 628 566 | 8/2013 |
| EP | 3 081 331 | 10/2016 |
| KR | 10-1191653 | 10/2012 |
| KR | 10-1589548 | 2/2016 |
| WO | 96/05781 | 2/1996 |
| WO | 2006/063540 | 6/2006 |

\* cited by examiner

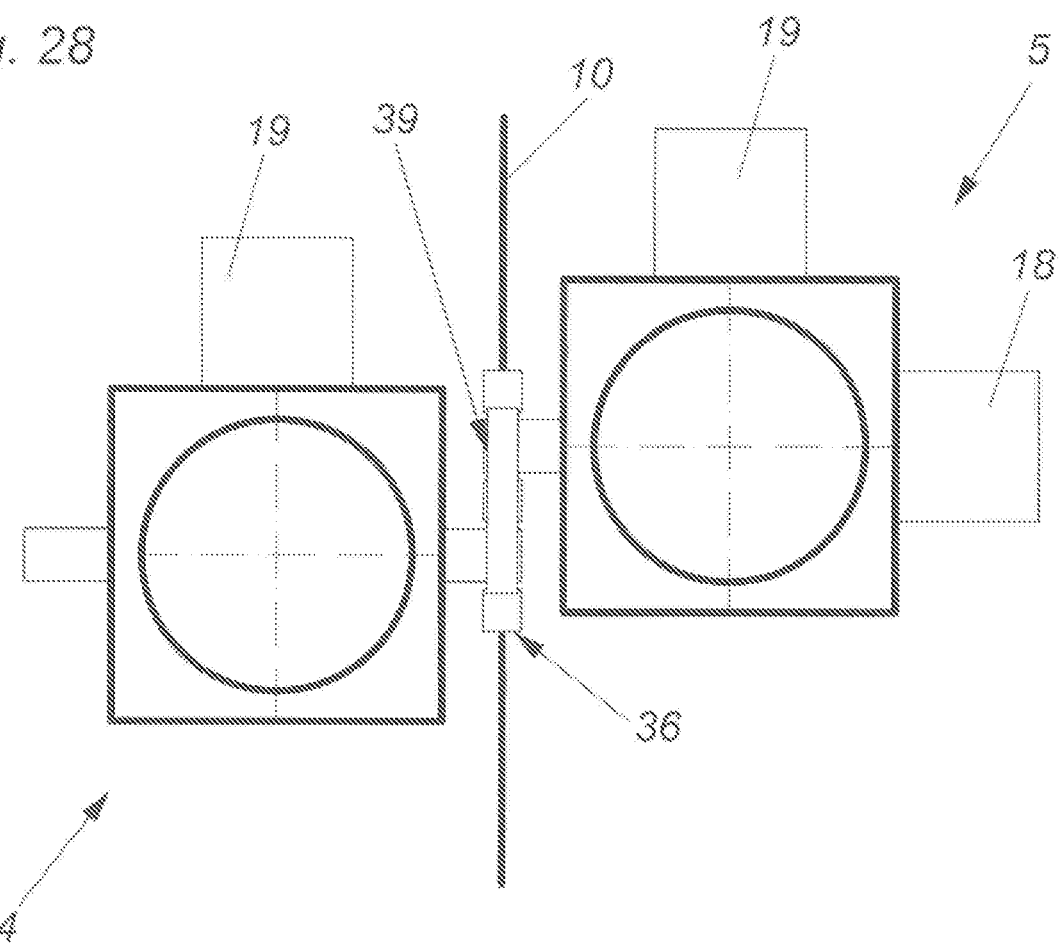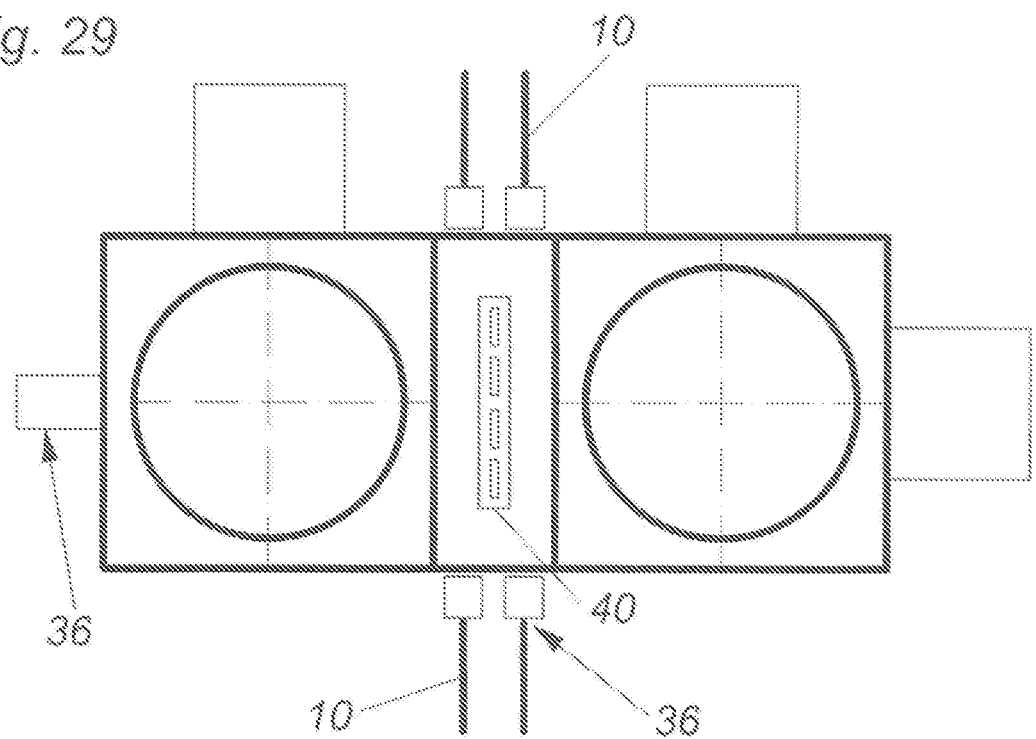

025211# PROCESSING MACHINE FOR THE PRODUCTION OF A DENTAL WORKPIECE

BACKGROUND OF THE INVENTION

The present invention concerns a processing machine for the production of a dental workpiece from a blank. The processing machine includes a housing in which a first chamber and a second chamber are arranged, the second chamber being separate from the first chamber, a first holding device for a blank, the first holding device being arranged in the first chamber and being movable relative to the housing, a second holding device for a blank, the second holding device being arranged in the second chamber and being movable relative to the housing, and a processing device being movable relative to the housing. Moreover, the invention concerns the use of such a processing machine for the production of dental workpieces from a blank.

For many years, processing machines have been used when producing dental workpieces, in which the processing machines process a dental workpiece from a blank on the basis of corresponding data records. Mostly, CNC processing machines (Computerized Numerical Control), in particular CAD/CAM processing machines, are used. All objects which can be processed in the dental industry can be understood as blanks. Blanks can be in the form of cylindrical discs, polygons, or pre-milled blanks.

Depending on the workpiece to be produced, it can be necessary that the blank is dry processed or wet processed. In order to not have to carry out complex cleaning works too often, it is known from the DE 10 2006 023 673 B4 that in the milling device (corresponds to the processing machine) two separate chambers for different types of milling (dry milling and wet milling respectively) are provided. The chambers are separated by a partition wall. According to this document, one milling head (corresponds to the processing device) each for the production of dentures is arranged in each of these two chambers. As such milling heads are relatively complex devices and also have to be driven separately, they are rather expensive.

SUMMARY OF THE INVENTION

The object of the present invention, thus, is to prevent the above-mentioned disadvantages. In particular, the processing machine should be cheaper and should bring a simplification compared to the prior art. Nevertheless, a separate processing should be possible.

According to the invention, a blank held in the first holding device and a blank held in the second holding device can be processed by the processing device.

Generally, two separate and complex processing devices are not necessary. Rather, by the same processing device, a cheap processing of a blank can be carried out in the two chambers. Thus, the processing device is alternatingly movable into the first chamber and into the second chamber. Therefore, the processing device can carry out a pendulum operation.

A second (auxiliary) processing device can also be provided, for example, for additional processing operations. Even if this is the case, then still the (main) processing device is movable in both chambers. Particularly preferred, however, is that the processing machine comprises only one processing device.

With known processing devices, a blank can be machined or can be processed in a material-removing manner. This represents a preferred embodiment of the invention. However, it shall not be excluded that instead of (or in additional to) the material-removing processing device, a material-applying device is provided which works substantially according to the principle of additive manufacturing techniques.

According to a preferred embodiment, the processing device comprises a drive device, a processing shaft which is rotatably driven by the drive device, and a processing tool which is fixed in the processing shaft. For example, a milling cutter, a drill, a grinder, and objects for identifying and/or scanning or the like can be used as processing tool. Generally, a tool magazine for the equipping of the processing device with different processing tolls can also be provided. For this purpose, separate magazines for different kinds of tools can also be provided. Different kinds of tools are, for example, tools for the dry processing and tools for the wet processing. In particular, different processing tools can be automatically inserted in the processing shaft according to the requirements.

The two chambers can be formed completely separate from each other in two semi-housings of the housing of the processing machine (the semi-housings can even be movable to each other). Preferably, however, the housing comprises a partition wall, and the two chambers are separated from each other by the partition wall. The housing serves as a separation of the interior of the machine from the machine environment. The housing can also comprise a machine bed which in this case acts as a supporting structure.

The two chambers can be constructed completely identical. However, in order to adapt the processing machine for different possible applications, preferably the first chamber forms a processing area for a dry processing of the blank held in the first holding device and that the second chamber forms a processing area for a wet processing of the blank held in the second holding device Preferably, the chamber with the processing area for the wet processing comprises at least one (additional) introducing device, preferably at least one nozzle, for introducing a liquid, preferably water or a cooling lubricant, into the processing area. For example, metal can be processed under a water cooling in the second holding device (workpiece mount). After this processing is finished, the processing shaft moves into the first chamber with the first holding device. Here, the processing of for example zirconium can be carried out. Dental technicians, thus, can process materials which have to be dry processed and wet processed. If one would actually wet process a blank in a first processing step and subsequently dry process a blank, for example a blank made of zirconium, there would be the problem that the porous zirconium material absorbs the moisture which would, thus, lead to bad results in the denture. In order to eliminate these problems a dental processing machine according to the invention is used which allows a pendulum operation. Thus, generally two processing areas are provided which are separated from each other in such a way that the blanks are not adversely affected by the processing of the other blank. Accordingly, a processing machine is at the dental technician's disposal which machine can process two blanks successively—without the intervention of the dental technician. Thus, also an increase of the flexibility is reached.

Each of the two chambers is built in such a way that it is enclosed on all sides by limiting walls of the housing. Preferably, four sidewalls (oriented substantially rectangular to each other), a floor element, and a covering element are provided as limiting walls. One of the sidewalls can simultaneously form the partition wall to the other chamber.

Particularly preferable, one of the limiting walls comprises a first access opening to the first chamber and a second access opening to the second chamber. However, the access openings can be designed in the form of a single opening via which the access is possible to the two chambers.

In principle, it is possible that the whole processing device can be moved into the two chambers and can be moved out of the two chambers via the respective access openings. Preferably, however, the processing device, preferably only a part of the processing shaft together with the processing tool, is at least partly movable through the first access opening into the first chamber or is at least partly movable through the second access opening into the second chamber.

The processing device can be formed separate from the housing. For example, the processing device can be situated next to the housing and only the processing shaft together with the processing tool can be moved through the access openings to the processing areas in the chambers. Preferably, however, it is provided that the processing device, preferably its drive device, is—preferably linearly—movably supported on the (outside surface of the) limiting wall.

In order to avoid contaminations beyond the chambers, each access opening can be closed by closing mechanisms, preferably each formed by at least one closing door movably supported on a frame. However, also a flexible element, for example a rubber mat, with a drive-in slot for the processing shaft or for example brushes can be used as closing mechanism.

It is possible that the processing device can only be moved along a linear moving axis into the chambers and out from the chambers and that the movements into the remaining two spatial axes, which are necessary for the processing, are carried out by the holding devices for the blanks. Preferably, however, the processing device can be moved in the chambers in at least two spatial axes. In order to allow this possibility and in order to simultaneously avoid contaminations beyond the chamber, according to one embodiment of the present invention the limiting wall is at least partly formed as a flexible and movable wall element, preferably as a folding bellow or as a sack element. Then, in particular, the closing mechanisms, preferably its frames, are mounted to the flexible and movable wall element. As a result, the closing mechanisms are movable relative to the chambers by the processing device, whereby the processing tool can also be moved in the respective chamber in two, preferably in all three, spatial axes. This, in turn, represents only a preferred embodiment and the moving axes can also be arranged in another configuration/orientation to each other.

In principle, the holding device can be constructed very simple, especially the more movements for the processing have to be carried out by the processing device. Generally, an element can be used as holding device which fulfils the function of a secure holding of the blank. Preferably, the first and the second holding device each comprise an outer ring being rotatably supported on the housing and being rotatably driven, and an inner ring being rotatably supported on the outer ring and being rotatably driven. Each, preferably disc-shaped, blank is then held in this inner ring by appropriate tensioning elements. Also, a semi-ring, which is not completely closed along the circumference, is to be understood as a "ring" (for the outer ring and for the inner ring). The ring also does not have to be in the form of a (semi-) circle. Preferably, each ring (outer ring and inner ring) is formed as a closed ring. Preferably, in a cross section the inner contours of the outer ring and of the inner ring are (at least partly) in the form of a circle. When there is no inner ring, the blank can be directly mounted to the outer ring or to another mounting device.

In order to having to install as few drive devices as possible in the processing machine, it is preferably provided that both holding devices, preferably their outer rings, can be synchronously driven by a drive device and can be rotated about a common rotary axis. Further, preferably the inner rings of both holding devices each can be rotatably driven by a drive device about a rotary axis.

According to a further preferred embodiment of the present invention, an open loop or closed loop control unit for controlling or regulating the processing machine is provided. Preferably, this open loop or closed loop control unit is part of an operating device which comprises a display device, preferably a screen, and an input device, preferably a keyboard together with a mouse. The dental technician can make all necessary settings and can control the processing of the blanks by way of this operating device. Particularly preferable, at least one data record is stored in a memory of the open loop or closed loop control unit, the data record representing a dental workpiece. In a processing mode of the open loop or closed loop control unit, the processing device and the first holding device or the second holding device can be controlled in such a way that the workpiece represented by the at least one data record can be processed from a blank held in the first holding device or in the second holding device.

A device which cleans—for example dries or removes the dust which is occurs in the processing of a blank—the processing shaft can also be provided between the two chambers.

Also described is the use of processing device according to the invention for the production of dental workpieces from a blank. Here, blanks can be alternatingly processed in the first chamber and in the second chamber by the processing device.

BRIEF DESCRIPTION OF THE DRAWINGS

Further details and advantages of the present invention are described more fully hereinafter by means of the specific description with reference to the embodiments illustrated in the drawings, in which:

FIGS. 15 to 17 show cross sections through the processing machine during the movement of the processing shaft through the passing opening and FIGS. 18 to 31 are schematic illustrations of several embodiments of the processing machine.

DETAILED DESCRIPTION OF THE INVENTION

Figure 1:
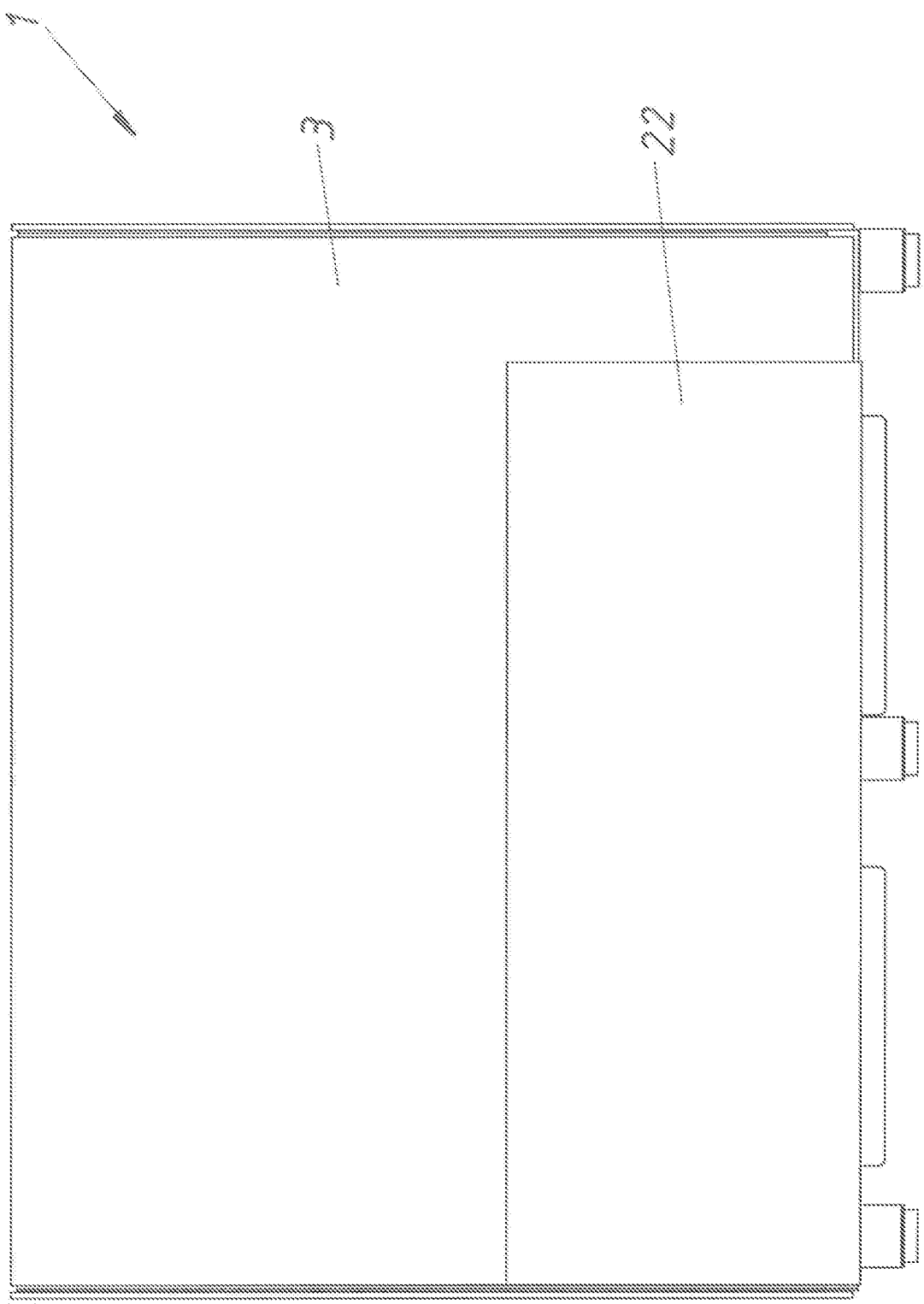
FIG. 1 is a front view of the closed processing machine.

FIG. 1 shows a processing machine 1 in a front view. Only the outside surface of the housing 3 is visible. A movable, preferably slidable, cover element 22 is arranged in the lower area.

Figure 2:
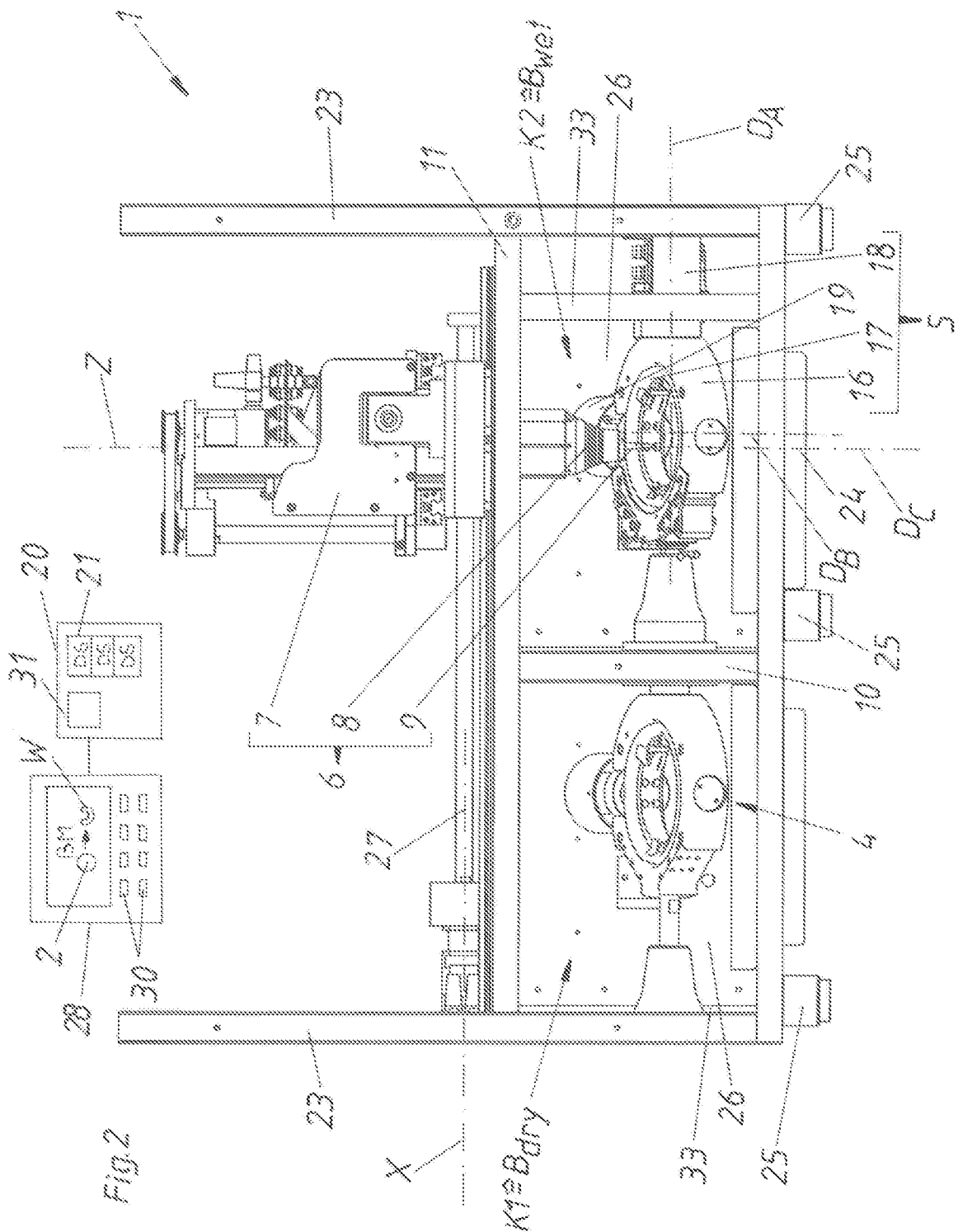
FIG. 2 is a front view of the processing machine without the cover of the housing.

The front side of the housing 3 of the processing machine 1 is hidden in FIG. 2. Thereby, the view into the interior of the processing machine 1 is free. The housing 3 comprises two lateral frame elements 23. The frame elements 23 are connected to each other by a floor plate 24 in the lower area. Supporting feet 25 are attached to the floor plate 24. In the central area, the frame elements 23 of the housing 3 are connected with each other by a limiting wall 11. The partition wall 10 is arranged in vertical direction between this limiting wall 11 and the floor plate 24. This partition wall 10 separates the first chamber K1 from the second chamber K2. Both chambers K1 and K2 are enclosed on all sides by the housing. Concretely, the chambers K1 and K2 are partly enclosed by the frame elements 23, by the sidewalls 33, by the floor plate 34, by the limiting wall 11, by the partition wall 10, by the rear wall 26 and by the not shown front wall (cover element 22), and are formed by these components. This represents purely a preferred embodiment of the chambers K1 and K2. These chambers K1 and K2 can also be formed divergent from this illustration. Preferably, however, the chambers K1 and K2 are largely dust-tight and/or watertight in a closed state in which a processing is also carried out.

A holding device 4 or 5 for a blank 2 is located in each of the chambers K1 and K2. Each holding device 4, 5 comprises an outer ring 16 rotatable about the rotary axis $D_A$ and an inner ring 17 rotatable about the rotary axis $D_B$. The outer ring 16 can be driven by the drive device 18 and is rotatably supported about the rotary axis $D_A$ on the housing 3. The inner ring 17, in turn, can be driven by the drive device 19 and is rotatably supported about the rotary axis $D_B$ on the housing 3. Preferably, the drive devices 18 and 19 are formed as electric motors (stepper motor or servomotor). A blank 2 (not shown here) can be fixed in or on the inner ring 17 by tensioning or clamping elements. The first holding device 4 in the first chamber K1 is formed substantially identical to the second holding device 5. The holding devices 4 and 5 can also be designed in such a way that the several blanks 2 can be fixed and processed.

Each of the chambers K1 and K2 forms a processing area for processing the blank 2 by the processing device 6. For example, the first chamber K1 can form a processing area $B_{dry}$ for dry processing and the second chamber K2 can form a processing area $B_{wet}$ for wet processing of the respective blank 2. A dry processing or wet processing can be carried out in both chambers K1 and K2 too. Depending on the use, the respective structural components are then adapted to the mechanical stress and to the materials to be processed. The processing device 6 comprises a drive device 7, processing shaft 8, and a processing tool 9. The processing device 6 is—in the direction of the spatial axis X—linearly movably supported by at least one rail 27 on the housing 3, in particular on the limiting wall 11 of the housing 3. The processing shaft 8 is movable by the drive device 7 in the direction of the spatial axis Z. Optionally, a movement of the processing shaft 8 in the direction of the spatial axis Y (perpendicular to the sheet level) is also possible. These movements in two or three spatial directions are carried out by the drive device 7, preferably by an electro motor each. The processing tool 9 is rotatably driven about the rotary axis $D_C$ by—preferably an electric motor of—the drive device 7. If it is not possible to mechanically perfectly separate the two chambers K1 and K2 from each other, then also a slight excess pressure can be generated in the chambers K1 and K2.

In FIG. 2, an operating device 28 with a display device 29 (screen) and an input device 30 (keyboard and/or mouse and/or touch-sensitive screen) is schematically shown in addition. This operating device 28 is connected to the open loop or closed loop control unit 20 or comprises the open loop or closed loop control unit 20. The open loop or closed loop control unit 20 comprises the processor 31 and the memory 21. The open loop or closed loop control unit 20 is signally connected to the processing device 6 and to both holding devices 4 and 5 of the processing machine 1. Several data records DS are stored in the memory 21. These data records DS represent dental workpieces W. Preferably, these data records DS represent a three-dimensional model (point cloud) of the dental workpiece W. In the processing mode BM of the open loop or closed loop control unit 20, the processing device 6 and the holding devices 4 and 5 are controlled in such a way that the dental workpiece W is processed from a fixed blank 2. This procedure is displayed representatively on the display device 29 of the operating device 28.

Figure 3:
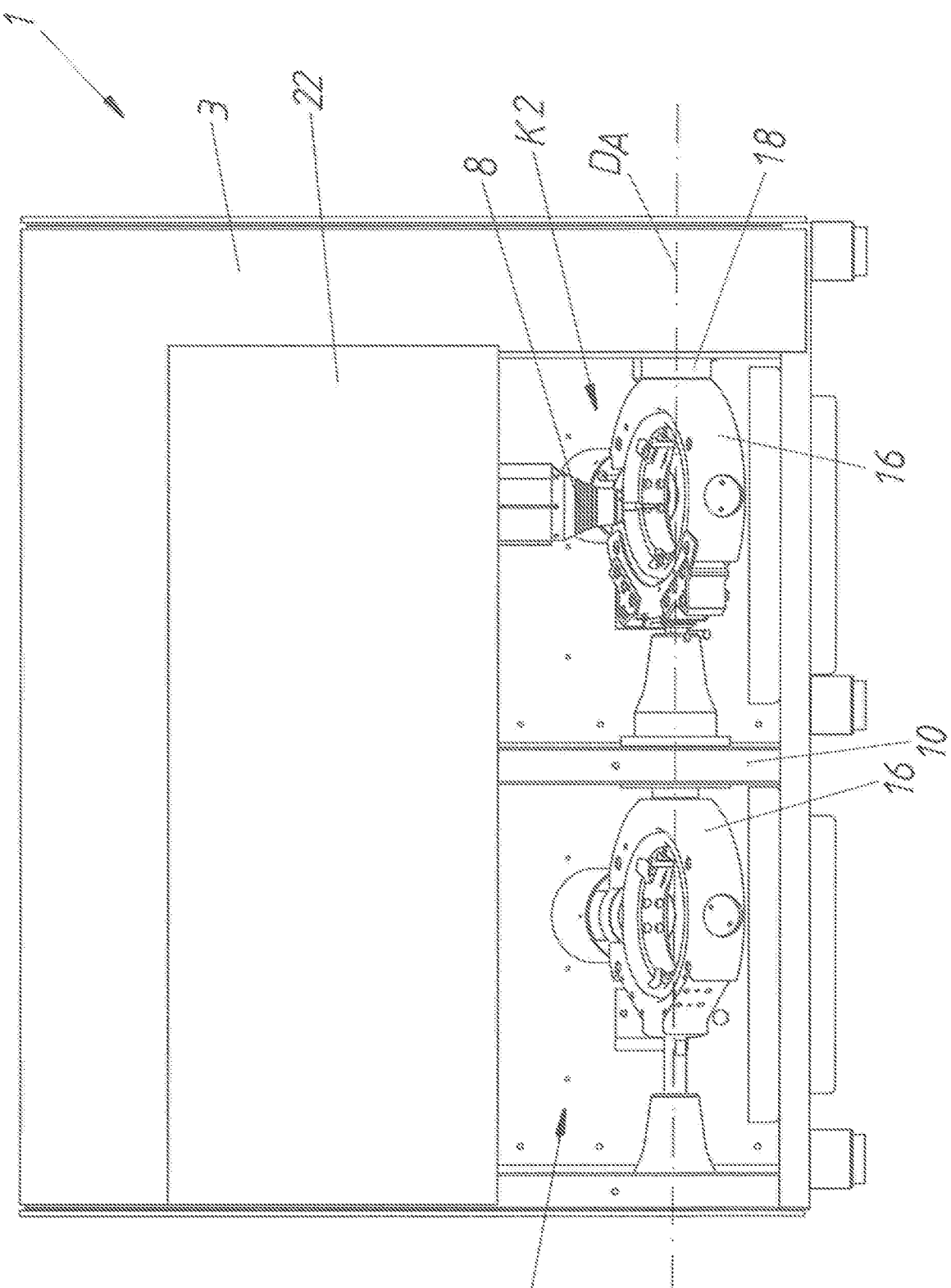
FIG. 3 is a front view of a partly opened processing device with synchronous holding devices.

In FIG. 3, the front wall of the housing 3 of the processing machine 1 is shown again, and the cover element 22 has been moved upward. Thus, the view into both chambers K1 and K2 is uncovered. It shall be clarified with this FIG. 3 that the outer rings 16 of both holding devices 4 and 5 can be rotatably driven by a common drive device 18 in a synchronous manner about the rotary axis $D_A$. For that purpose, both holding devices 4 and 5 are correspondingly coupled to each other through the partition wall 10.

Figure 4:
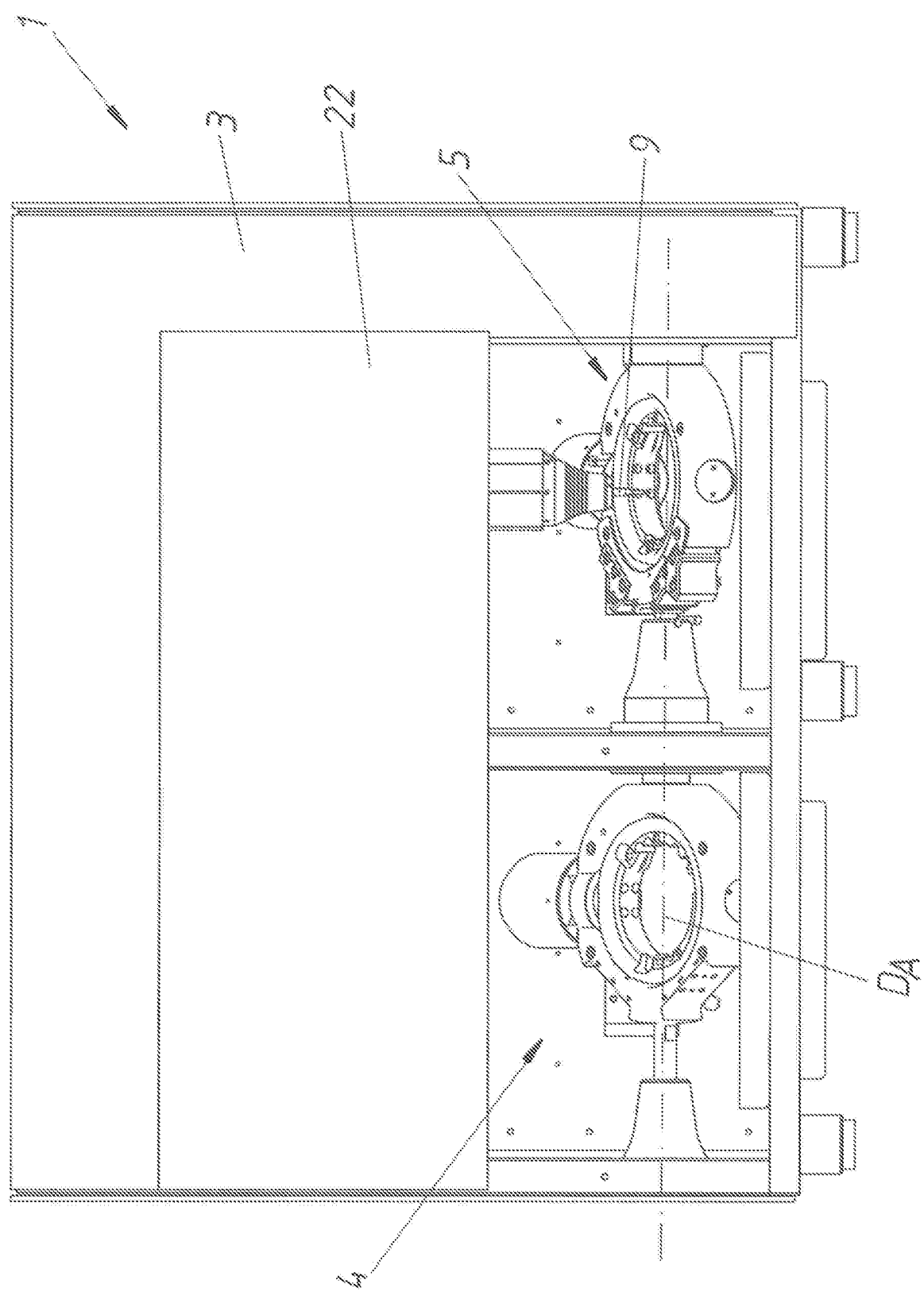
FIG. 4 is a front view of a partly opened processing machine with non-synchronous holding devices.

Contrarily, in FIG. 4 the two holding devices 4 and 5 are not coupled with each other. Thus, the outer rings 16 of both holding devices 4 and 5 can be moved independent from each other about the rotary axis $D_A$.

Figure 5:
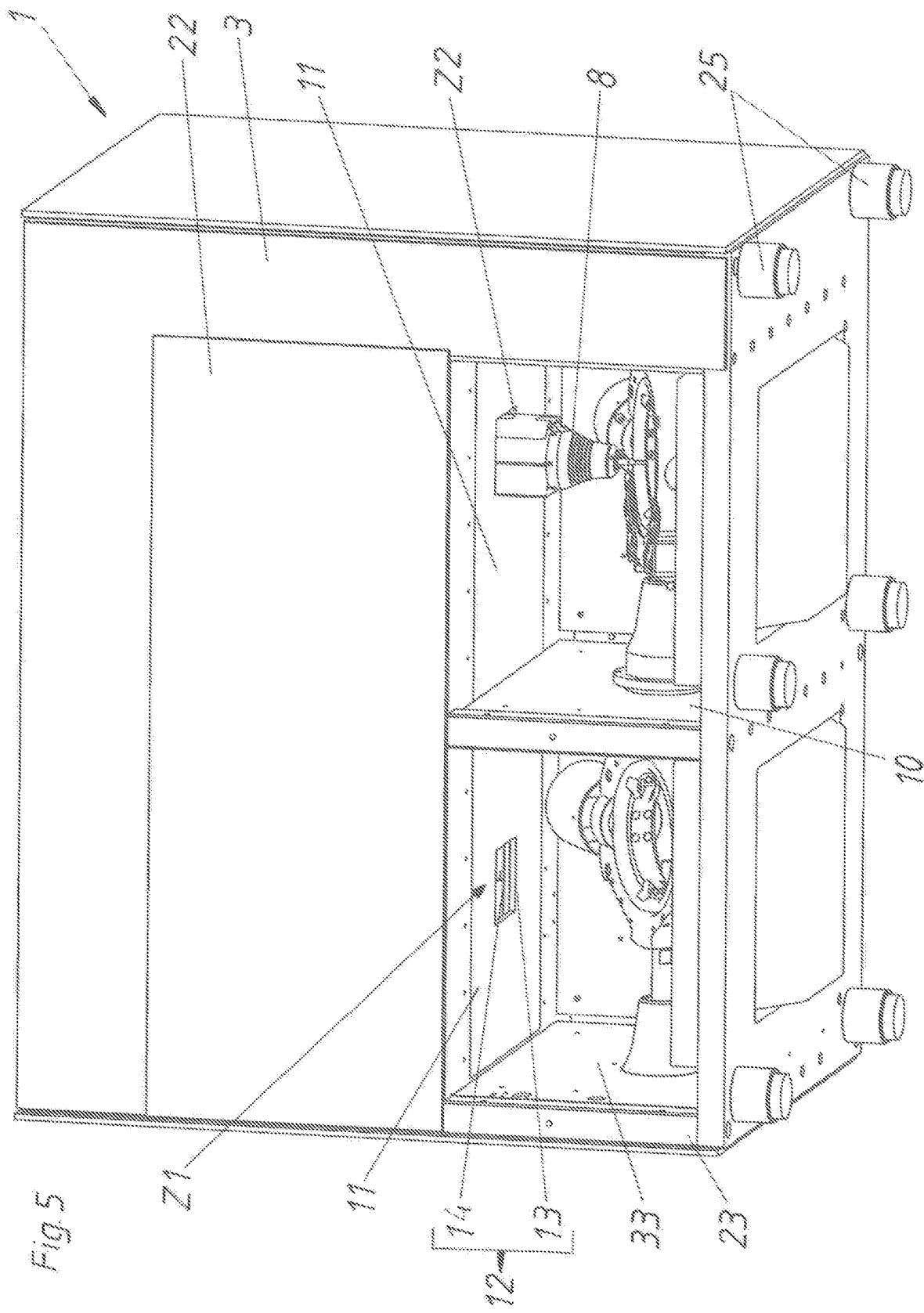
FIGS. 5 to 7 are angled views from below the movement of the processing shaft from the second chamber into the first chamber.

FIG. 5 shows the processing machine 1 in a perspective view in an angle from below. Thereby, the view onto the surface of the limiting wall 11 is free. In the area of the second chamber K2, the limiting wall 11 comprises a second access opening Z2, and the processing shaft 8 of the processing device 6 projects into the second chamber K2 through this second access opening Z2. In the limiting wall 11 of the first chamber K1, a—albeit closed—first access opening Z1 is formed too. This first access opening Z1 is closed by a closing mechanism 12. This closing mechanism 12 comprises a frame 13 and a closing door 14 movably supported on the frame 13. The movement of the closing door 14 can be controlled electrically, hydraulically, or pneumatically.

Figure 6:
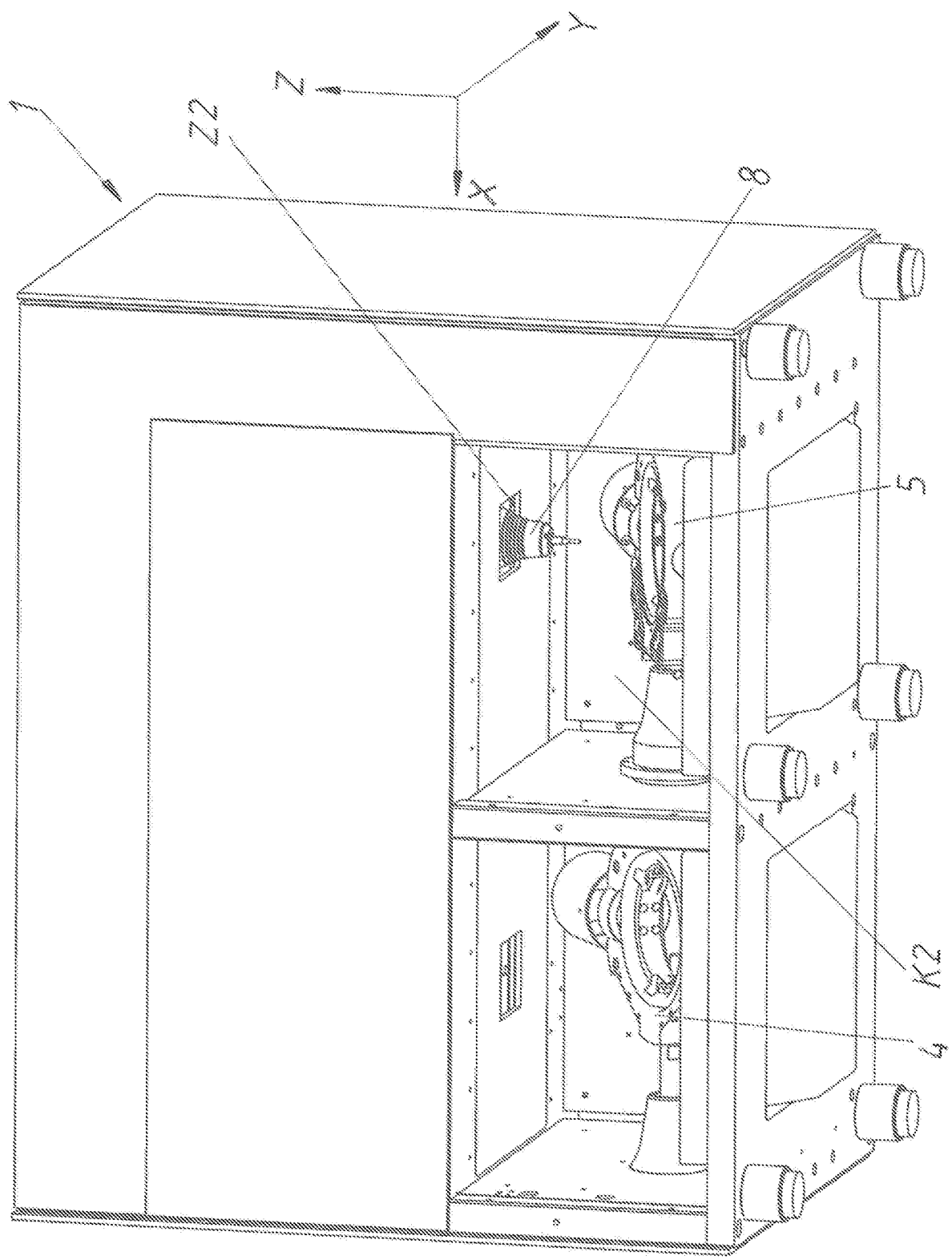

According to FIG. 6, the processing shaft 8 is moving out of the second chamber K2 in the direction of the spatial axis Z through the second access opening Z2.

Figure 7:
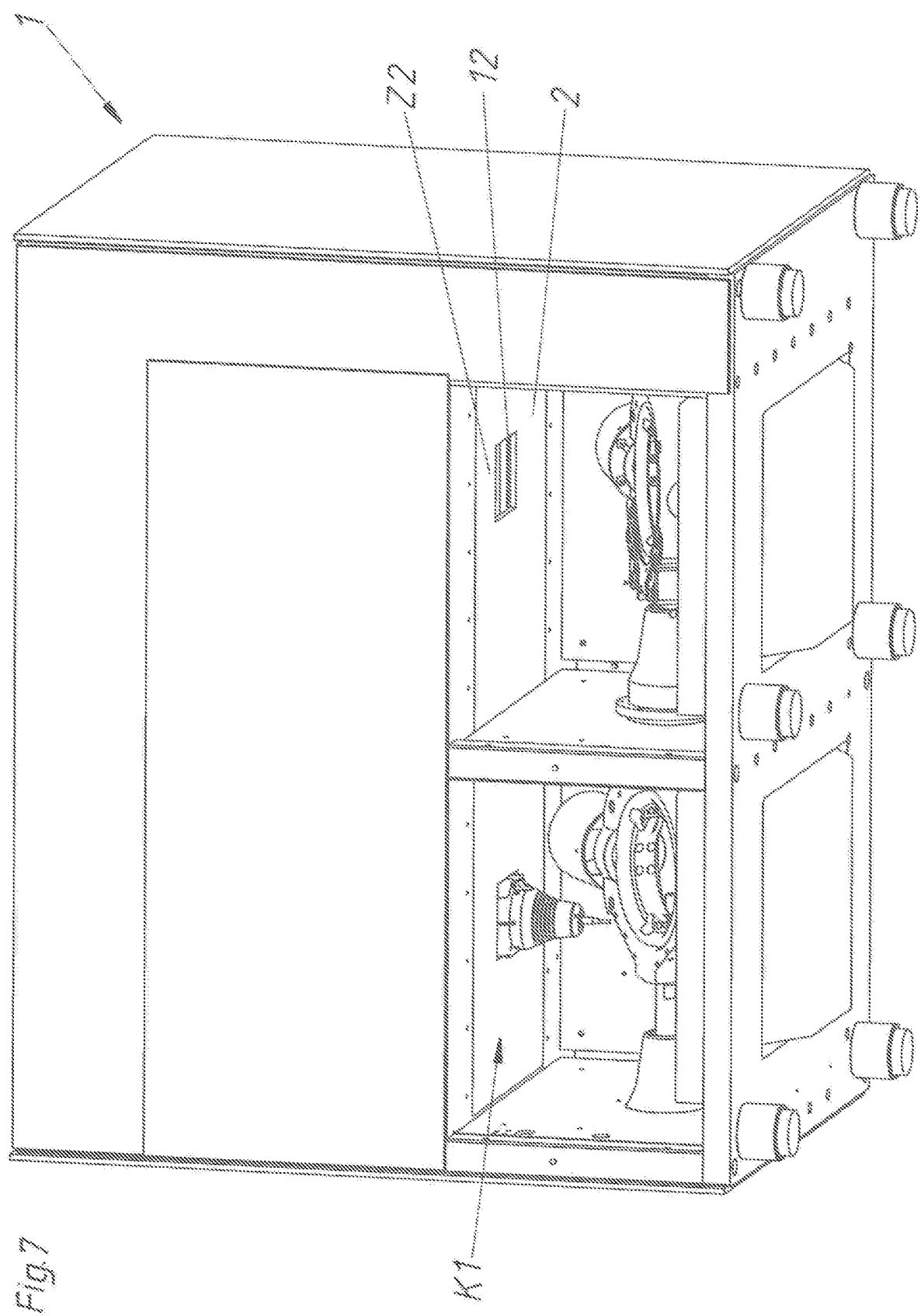

In FIG. 7, the processing shaft 8 of the processing device 6 is now moving through the (opened) first access opening Z1 into the first chamber K1. The access opening Z2 to the second chamber K2 is closed. Theoretically, the access openings Z1 and Z2 can also remain open as the chamber K1 or K2, in which the processing is being carried out, is closed by the inserted processing device 6.

Figure 8:
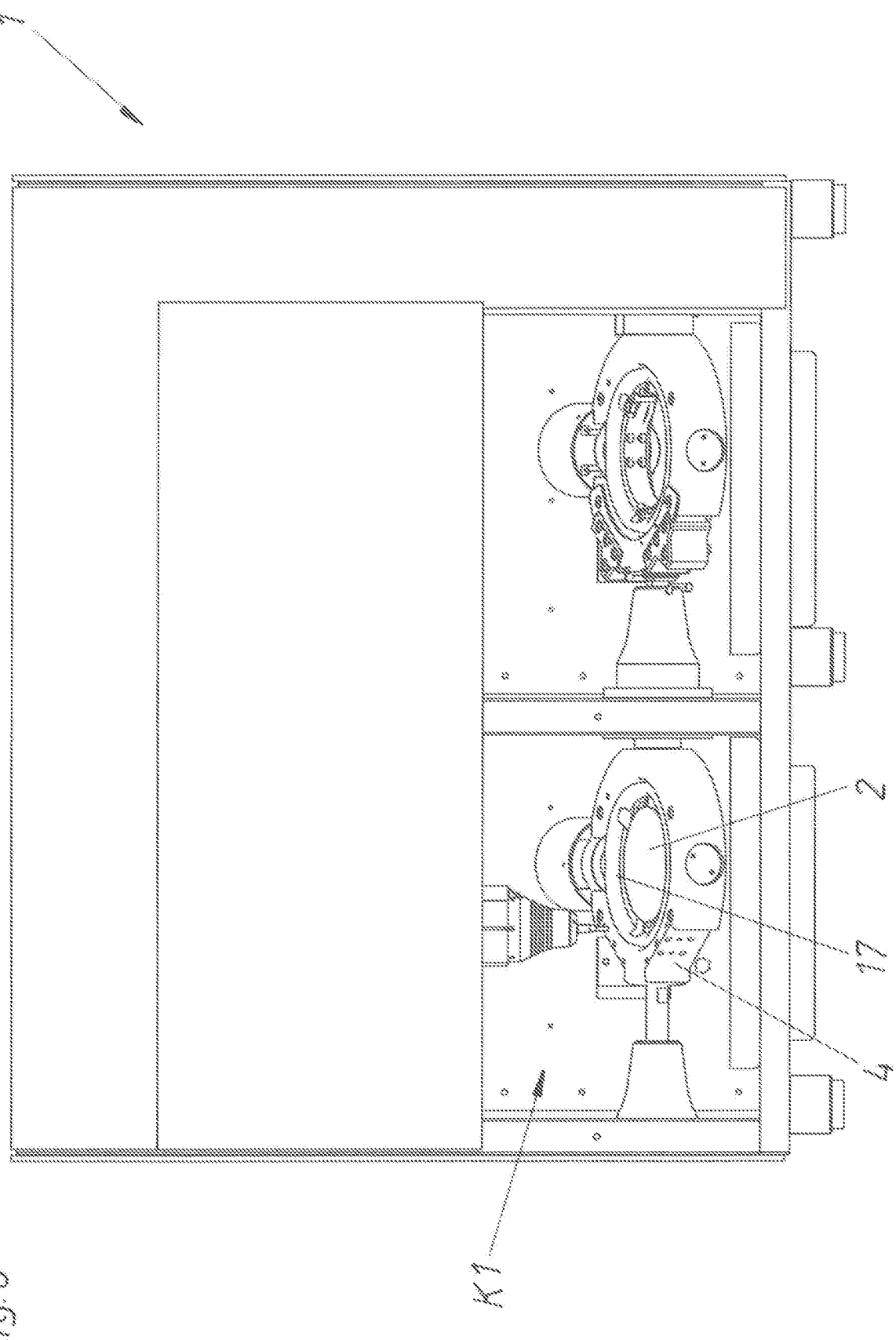
FIG. 8 is a front view with the processing shaft in the first chamber.

FIG. 8 shows in a front view corresponding to FIG. 7 that the processing shaft 8 of the processing device 6 has been moved into the first chamber K1. The blank 2 fixed in the inner ring 17 of the first holding device 4 is shown in this chamber K1 too.

Figure 9:
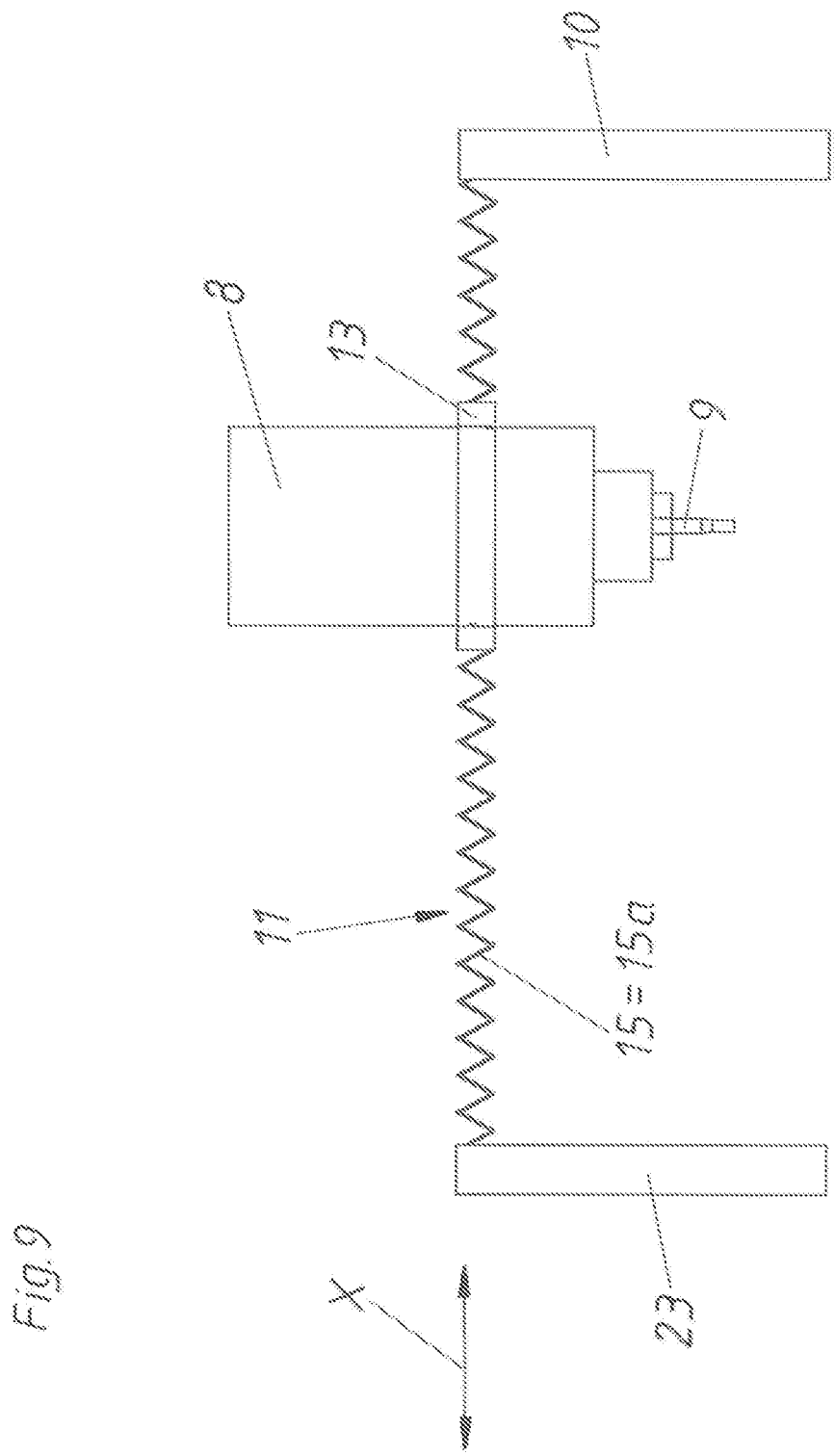
FIG. 9 is a schematic illustration of the limiting wall with a folding bellow.

FIG. 9 schematically shows that the limiting wall 11 is at least partly formed as a flexible wall element 15. Concretely, this flexible wall elements is formed as a folding bellows 15a. The closing mechanism 12 of the access opening Z1 or Z2 is connected to this folding bellows 15a. Specifically, the frame 13 of the closing mechanism 12 is attached to the folding bellows 15a. The processing shaft 8 of the processing device 6 is moved into the chamber K1 or K2 throughout this frame 13. The processing device 6 can be moved in the direction of the spatial axis X because of this flexible wall element 15 in the form of the folding bellows 15a. Here, on the one hand, a respective access opening for the chamber K1 and for the chamber K2 can be provided or, on the other hand, there is only one access opening. In the second case, however, the folding bellows 15a can be moved so far that both chambers K1 and K2 can be reached via the one access opening. For that purpose, a folding bellows for the direction Y can be provided, too.

Figure 10:
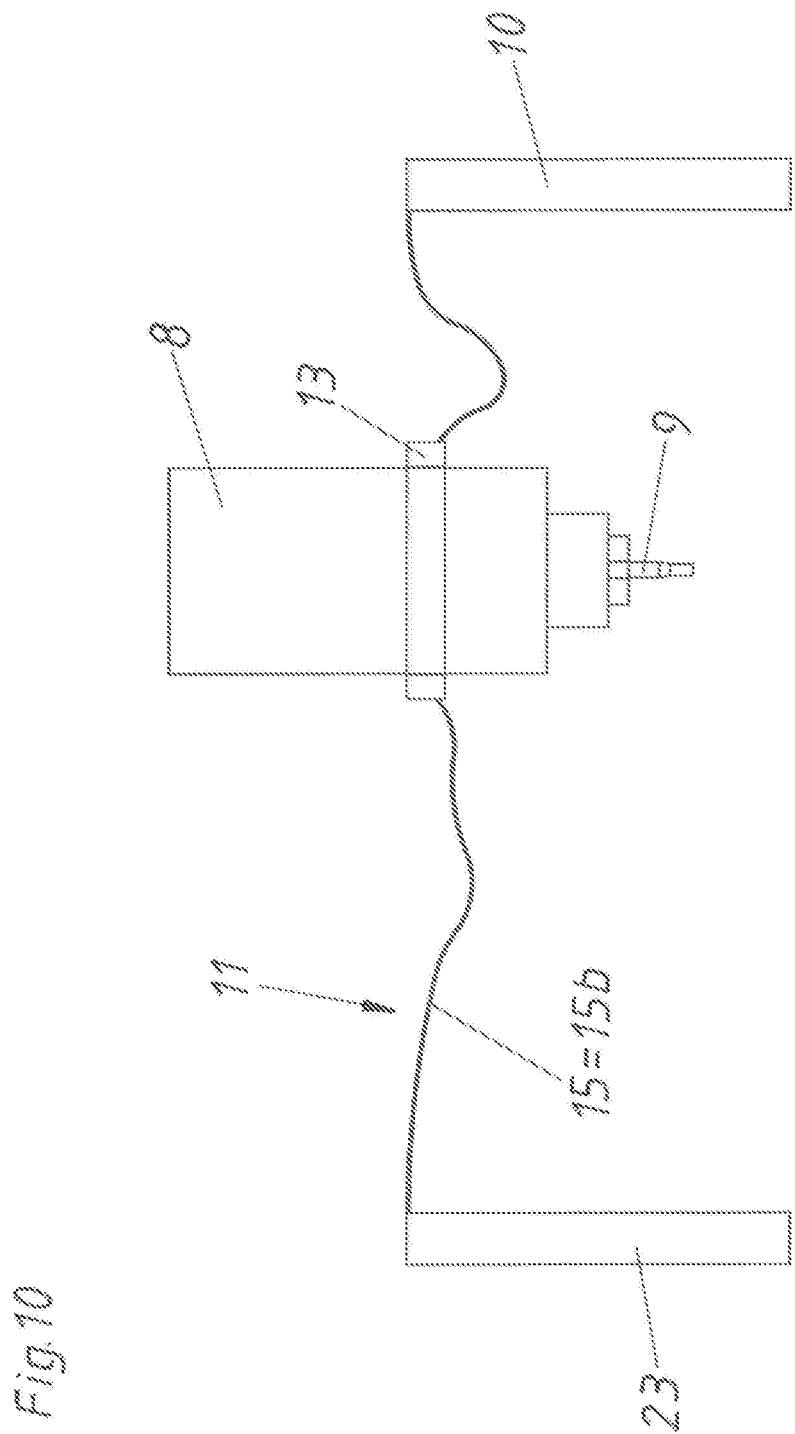
FIG. 10 is a schematic illustration of the limiting wall with a sack element.

According to FIG. 10, the flexible wall element 15 is formed as a sack element 15b. Thereby, not only a movement in the direction of the spatial axis X is possible for the processing shaft 8 inserted through the access opening Z1 or Z2, but also a movement in the direction of the spatial axis Y (rectangular to the sheet level) is possible. For example, this sack element 15b can be made of a dust-tight and watertight fabric or of a plastic material. The sack element 15b should enable a movement of the processing device 6 in all spatial directions at least so far as the processing tool 9 can reach all areas of the blank 2 fixed in the respective holding device 4, 5.

Further solutions which are not shown here can be that a rollable blanket is used instead of the folding bellow. Alternatively, a sheet metal can be used which moves together with the processing device 6 and is then protruding depending on which side the processing takes place.

Figure 11:
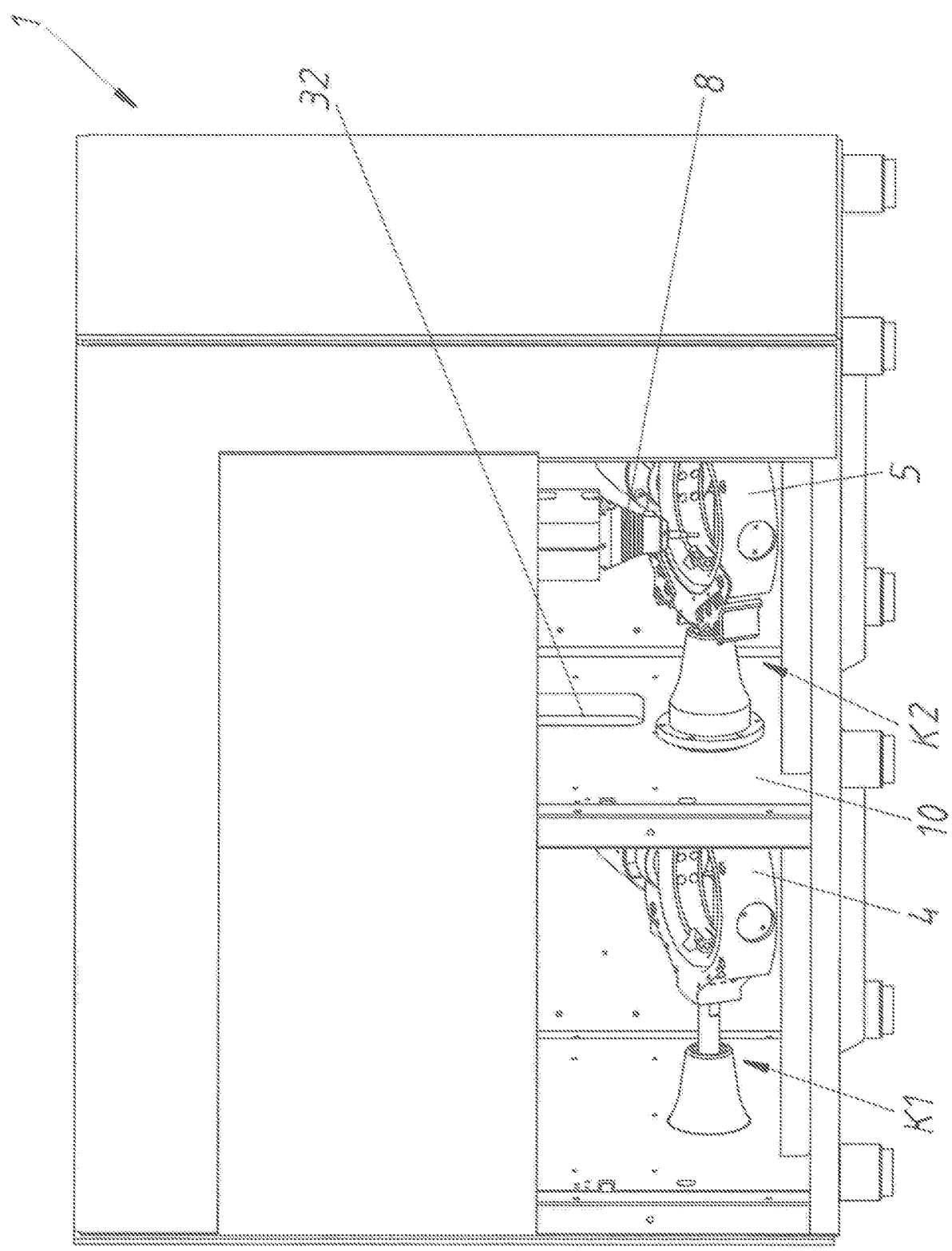
FIGS. 11 to 14 are different views the movement of the processing shaft through a passing opening in the partition wall.

FIG. 11 shows that a passing opening 32 is formed in the partition wall 10. Thus, the processing device 11 can switch directly through the partition wall 10 between the chambers K1 and K2. In this case, for example, only one access opening would be needed.

Figure 12:
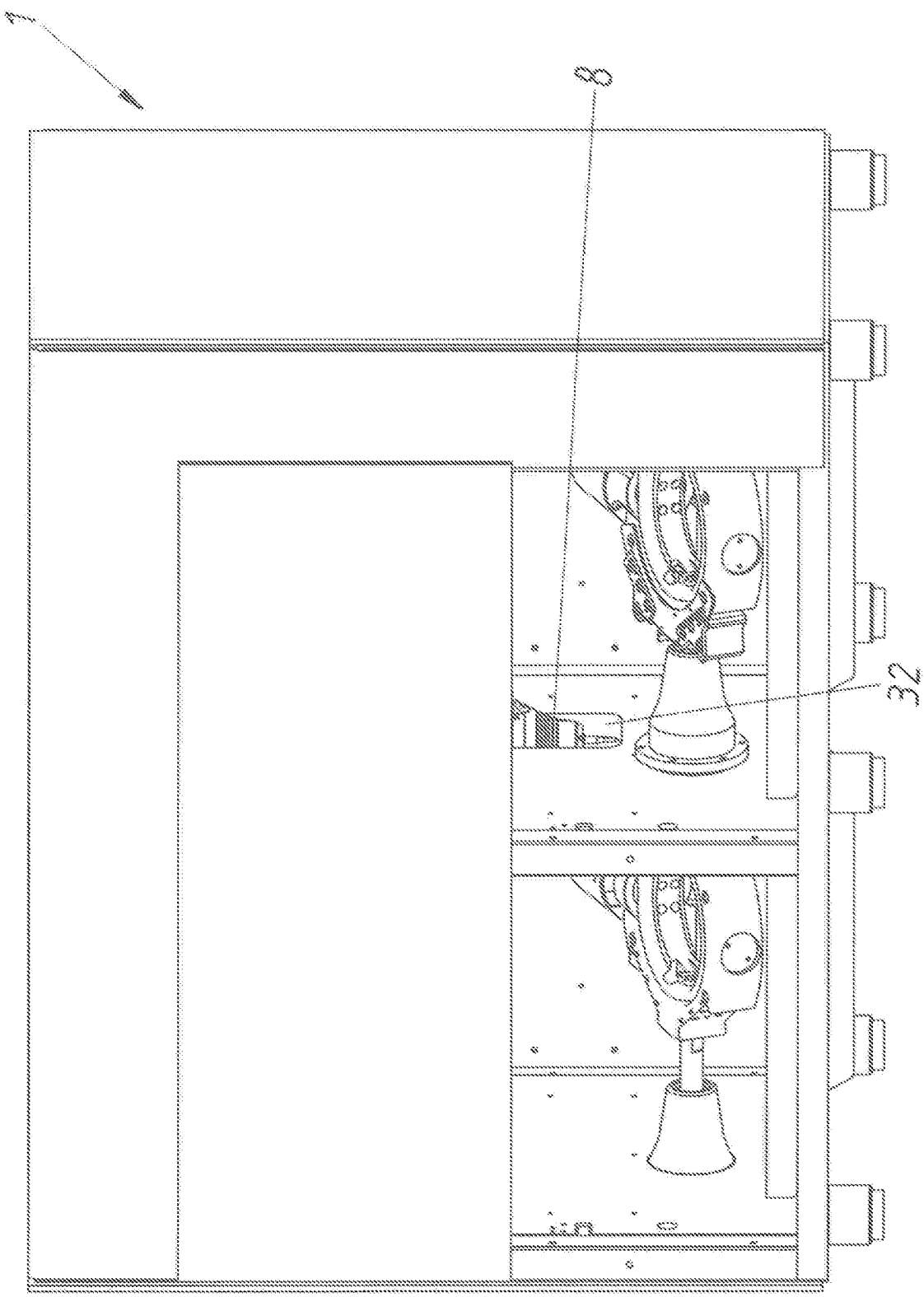
Figure 13:
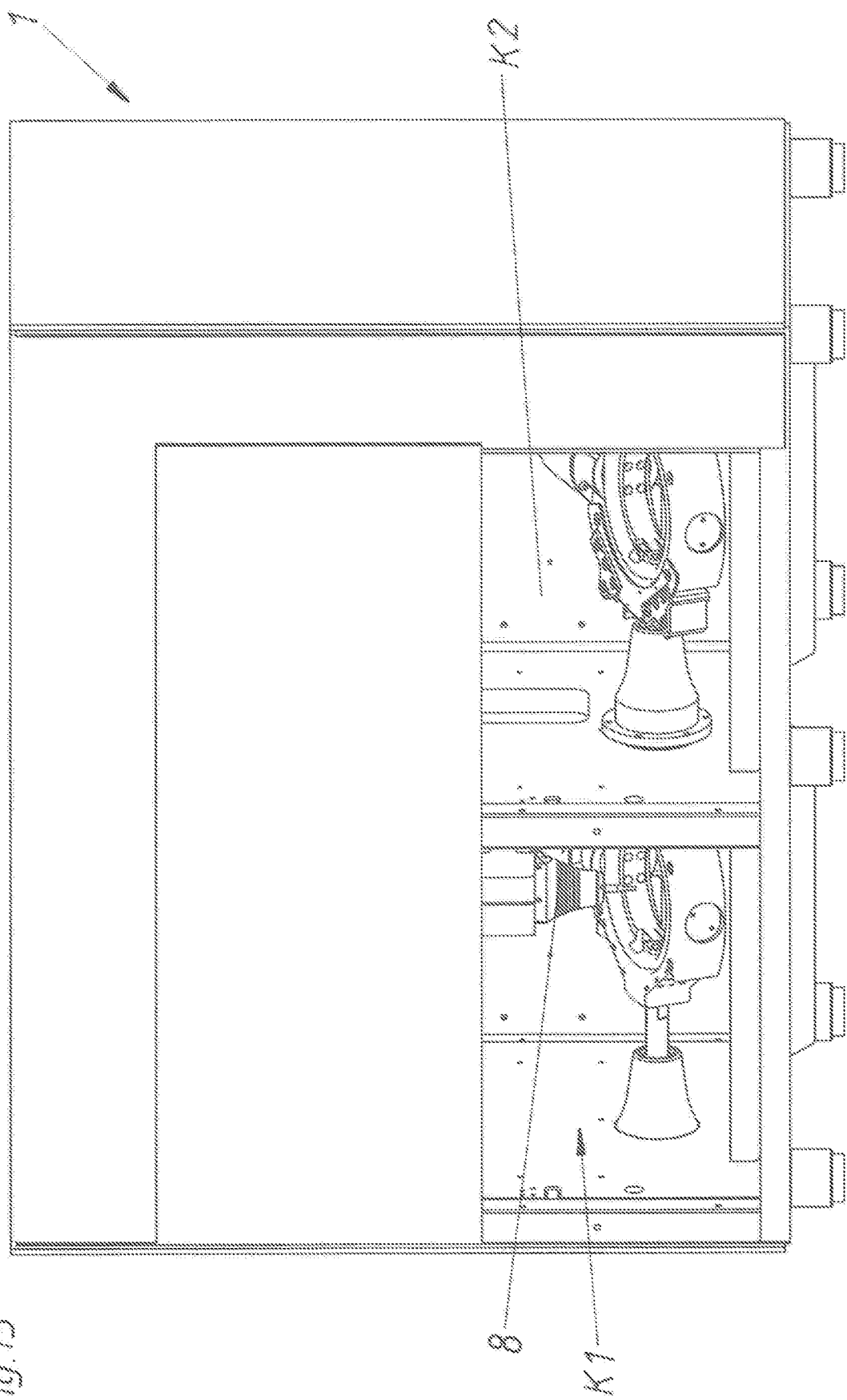

In FIG. 12 the processing shaft 8 of the processing device 6 is just switching from the second chamber K2 into the first chamber K1.

Figure 14:
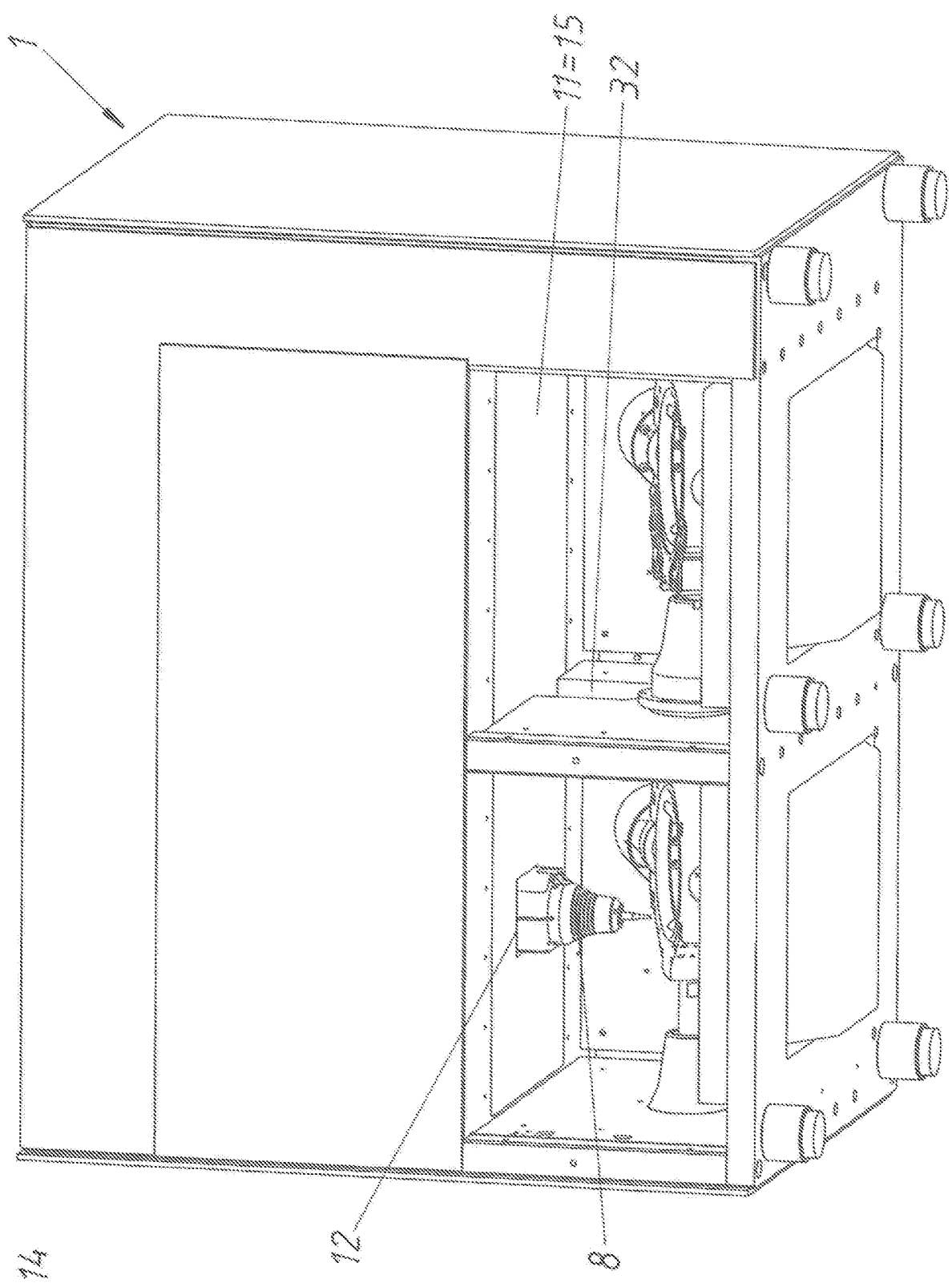

According to FIG. 14 the processing shaft 8 has reached the first chamber K1.

In FIG. 14, it is visible that in the case of this embodiment with the passing opening 32, only one access opening with a closing mechanism in the limiting wall 11 is necessary as long as the limiting wall 11 is at least partly formed as a flexible wall element 15. For that reason, the processing shaft 8 does not have to be moved out through the access opening in the direction of the spatial axis Z for a change between the chambers K1 and K2.

Figure 15:
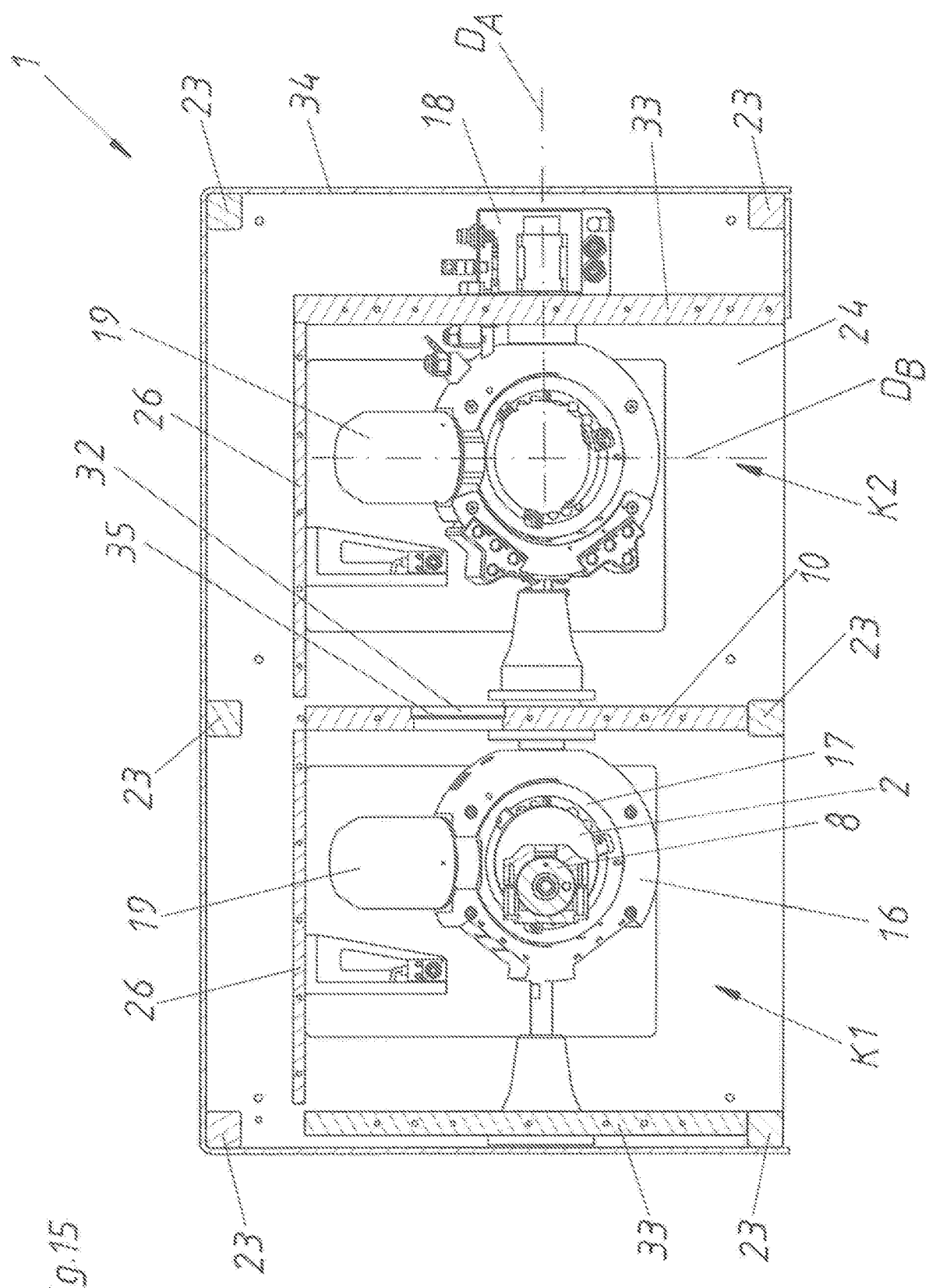

In FIG. 15, a horizontal section through the processing machine 1 is featured corresponding to FIG. 14. The housing 3 comprises as an outer shell the housing cover 34 attached to the frame elements 23. The two chambers K1 and K2 are concretely bordered by the sidewalls 33, the partition wall 10, the rear walls 26, the floor plate 24, the not shown limiting wall 11 and the also not shown cover element 22. In FIG. 15, both holding devices 4 and 5 with their outer rings 16, inner rings 17 and the drive devices 18 and 19 are also featured. The passing opening 32 closed by a closing element 35 is formed in the partition wall 10.

Figure 16:
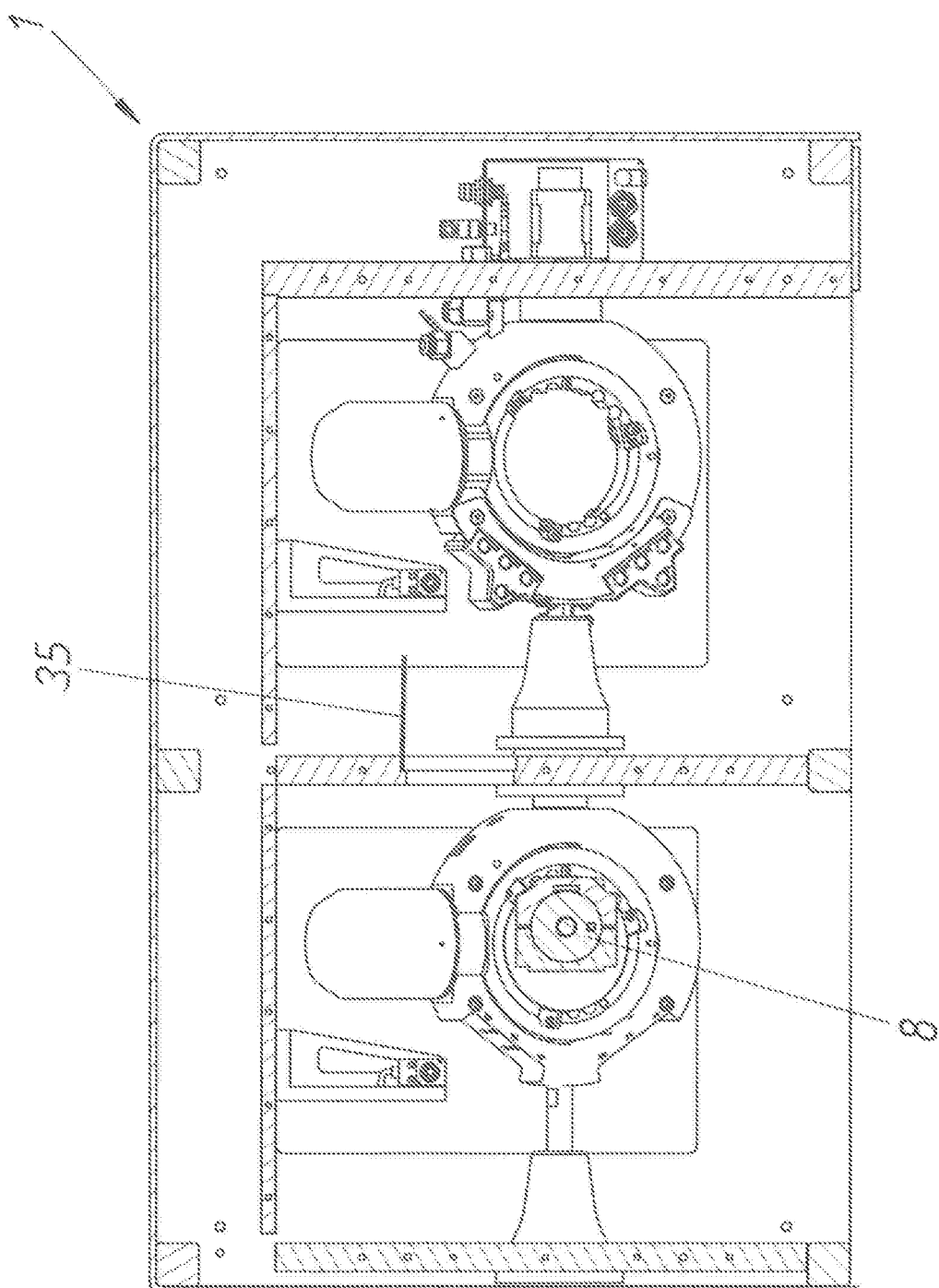

In FIG. 16, the closing element 35 has opened. The opening movement can be triggered electrically, pneumatically, hydraulically or in another manner. The closing element 35 can be closed, for example, by spring force and can be pushed open by the processing shaft 8 passing through.

Figure 17:
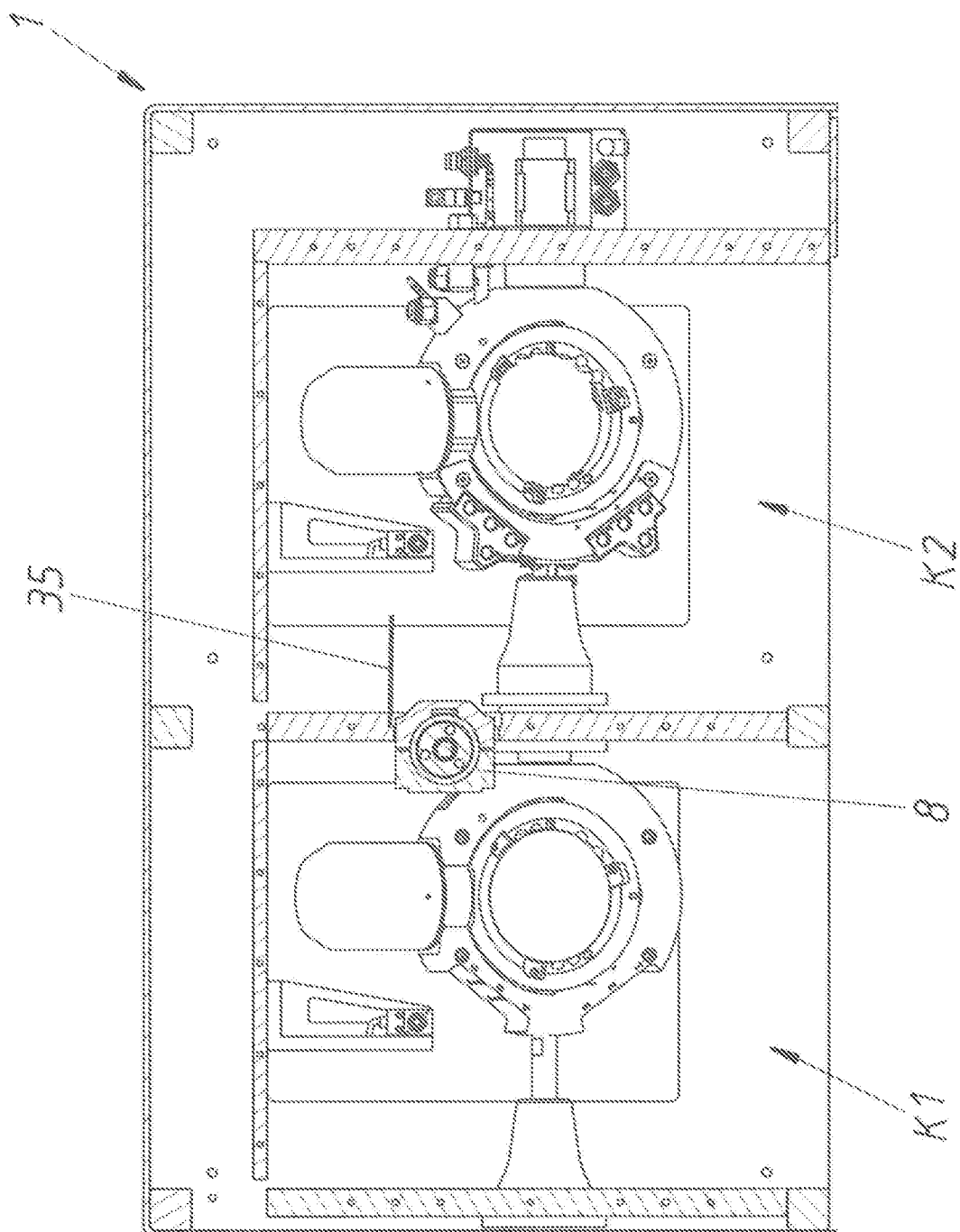

According to FIG. 17, the processing shaft 8 of the processing device 6 is moving through the passing opening 32 from the first chamber K1 into the second chamber K2.

Figure 18:
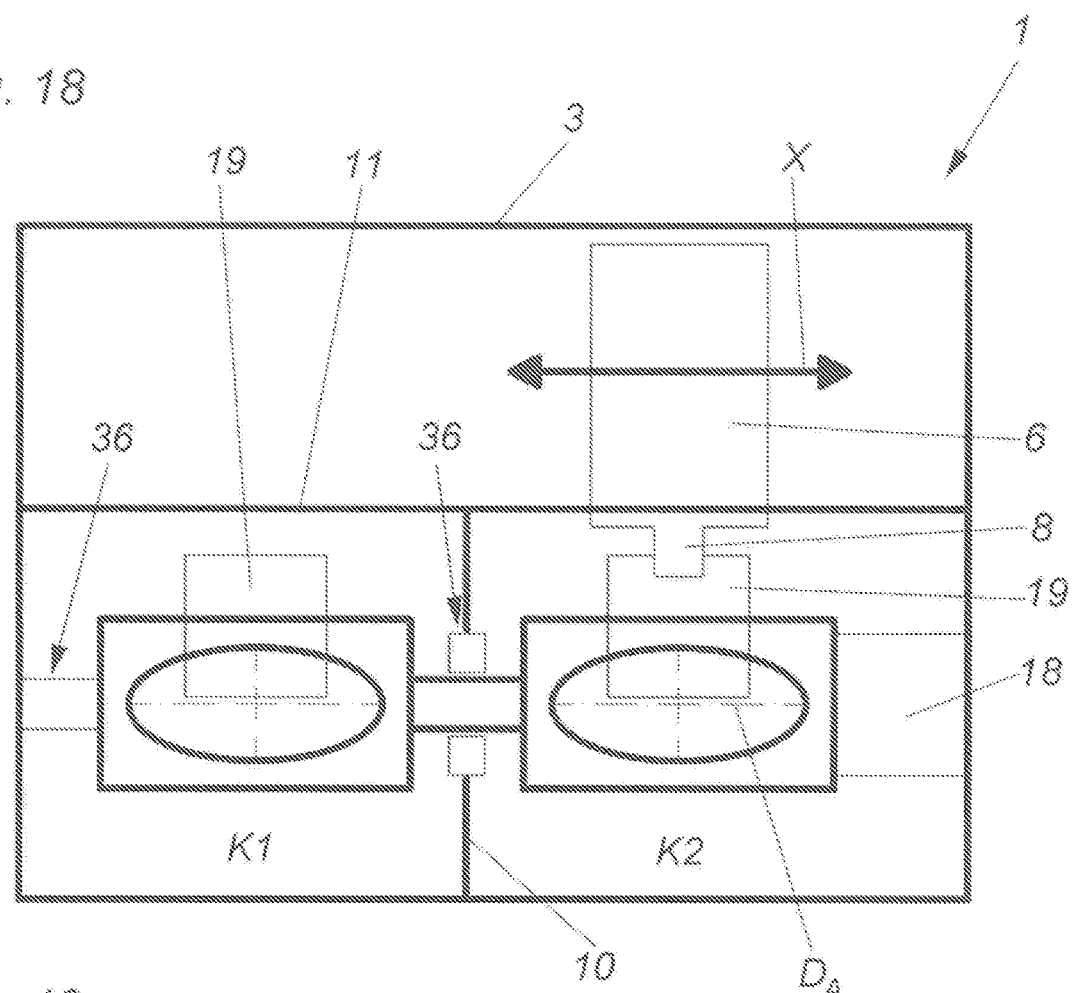

Starting from FIG. 18, the essential components of the processing device 1 are only shown schematically in order to shortly explain the different embodiments in detail.

According to FIG. 18, the basic structure provides that the drive devices 7 for the movement of the processing device 6 in the spatial axes X, Y and Z are attached to the machine bed and are guiding the processing shaft 8. The machine bed is attached to the limiting wall 11. The processing areas $B_{dry}$ and $B_{wet}$ are located below the processing shaft 8. Of course, however, also both processing areas can be used for dry processing or wet processing. The chambers K1 and K2 contain the workpiece mount (holding devices 4 and 5), wherein the chambers K1 and K2 are separated from each other by a partition wall 10. In other words, there is a processing space which is divided by a partition wall. According to FIG. 18 the outer rings 16 of both holding devices 4 and 5 are rotatably driven by a common drive device 18. For that purpose, support bearings 36 are provided in the area of the partition wall 10 and in the area of the sidewall 33. The two inner rings 17 are each rotatably driven by autonomous drive devices 19.

Figure 19:
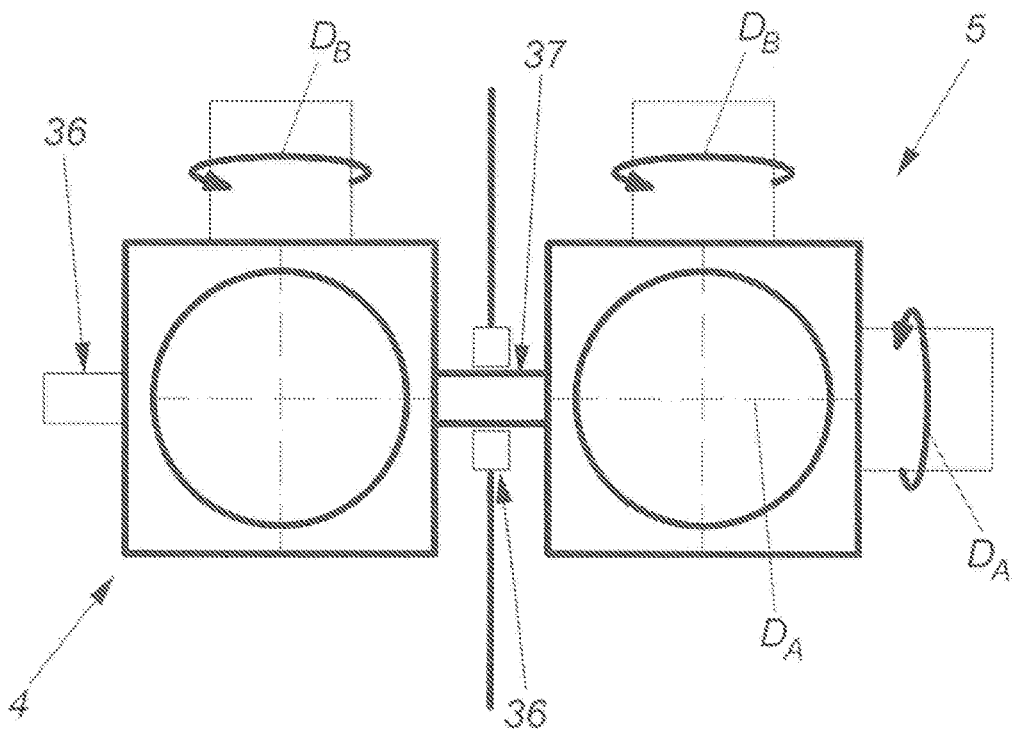

According to FIG. 19 both holding devices 4 and 5 are rotatably supported about the rotary axis $D_A$. Additionally, these holding devices 4 and 5 still comprise a second rotary axis $D_B$. These two rotary axes $D_A$ and $D_B$ are usually oriented in an angle of 90° to each other. Such a blank seating comprising the two holding devices 4 and 5 can be provided in both processing areas. Depending on the processing to be carried out, these devices can have special configurations. In the basic idea, the two holding devices 4 and 5 are synchronously moved about the first rotary axis $D_A$. In order to realize this, these devices are rigidly connected to each other (connecting element 37). The second rotary axes $D_B$ of the two holding devices 4 and 5 can be moved independently from each other. This offers the advantage that only one drive (drive device 18) is necessary for the movement of the holding devices 4 and 5 about the first rotary axis $D_A$.

Figure 20:
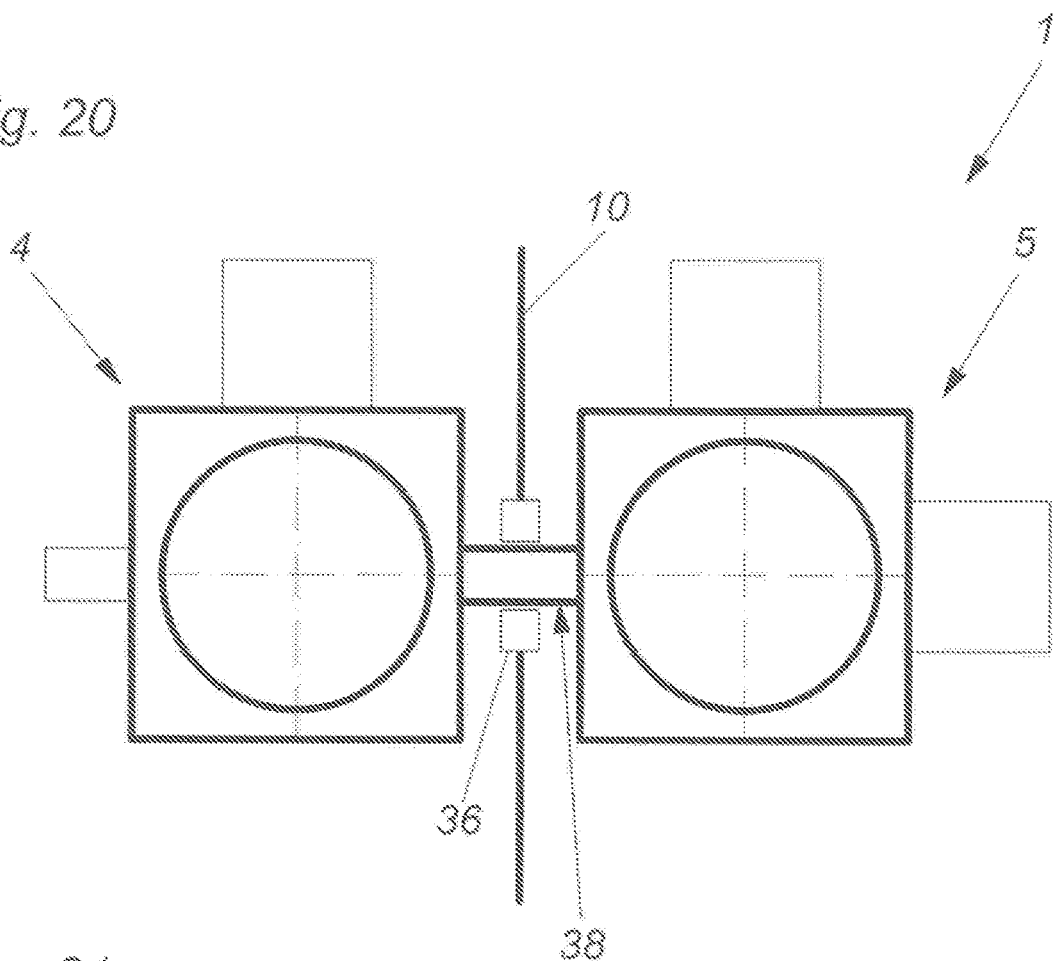

In a further embodiment according to FIG. 20, the two holding devices 4 and 5 are connected with each other via a coupling 38. Should it be necessary to newly load, for example, the processing area of the first chamber 1 while processing takes place in the second chamber K2, the first holding device 4 can be uncoupled and the user can reach into this area without danger. After the first holding device 4 is loaded the two holding devices 4 and 5 can then be coupled again.

Figure 21:
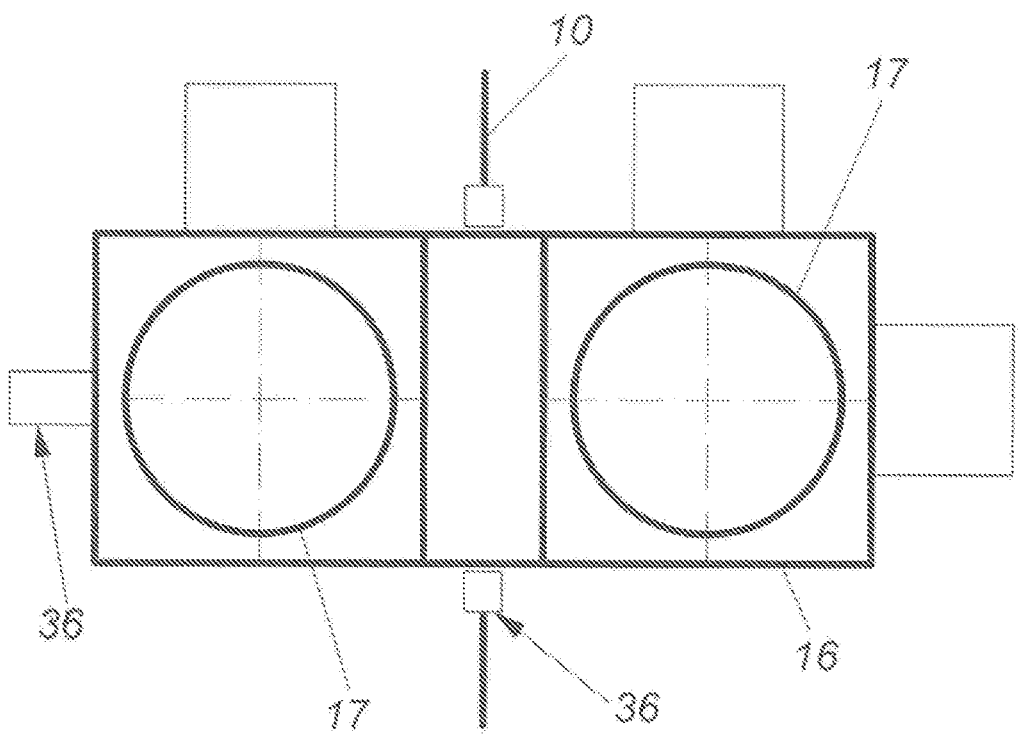

FIG. 21 shows another variant in which the two holding devices 4 and 5 consist of one part (common outer ring 16) which rotates about the first rotary axis $D_A$. Only the inner rings 17, which rotate about the second rotary axis $D_B$, are separate from each other. This integrally formed blank mount is then guided through the partition wall 10.

Figure 22:
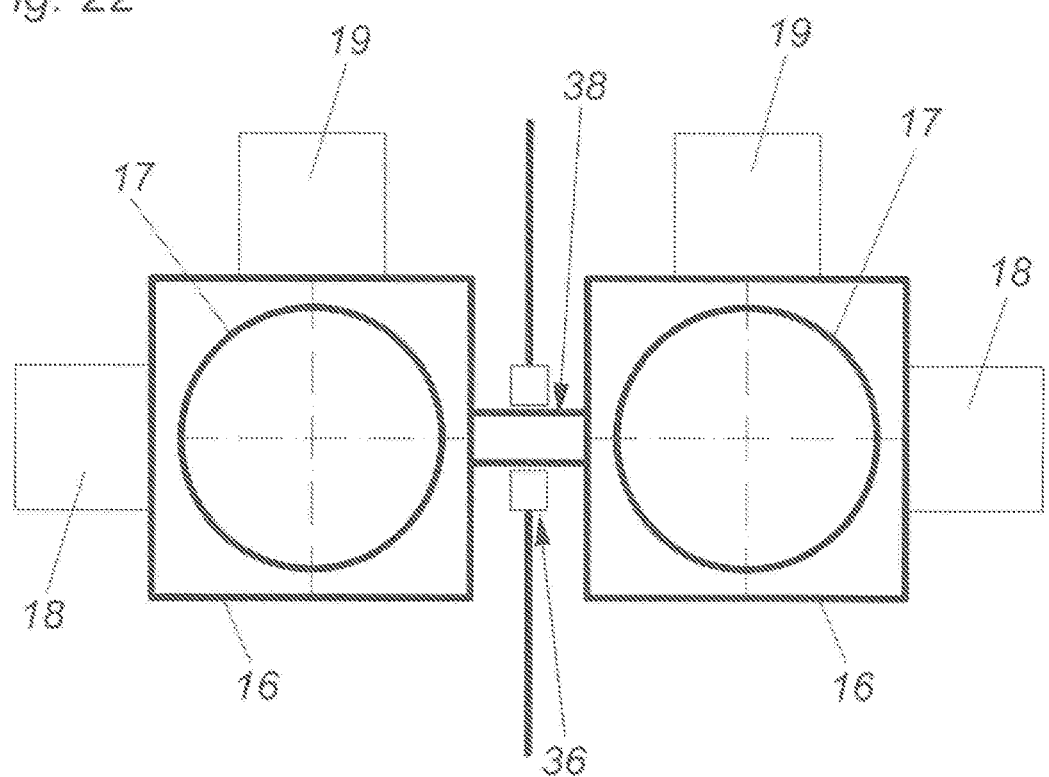

According to FIG. 22, both holding devices 4 and 5 comprise separate drive devices 18 for the movement about the first rotary axis $D_A$. Thus, no coupling 38 has to be provided. However, a coupling 38 could still be provided.

In all variants, a support bearing 36 is provided in the partition wall 10 or on the sidewall 33. This is the case especially when there is a rigid connection. Depending on the variant and the configuration, then also the basic structure differs, which means that the drives, bearings, gears, etc. can be arranged on different positions.

Figure 23:
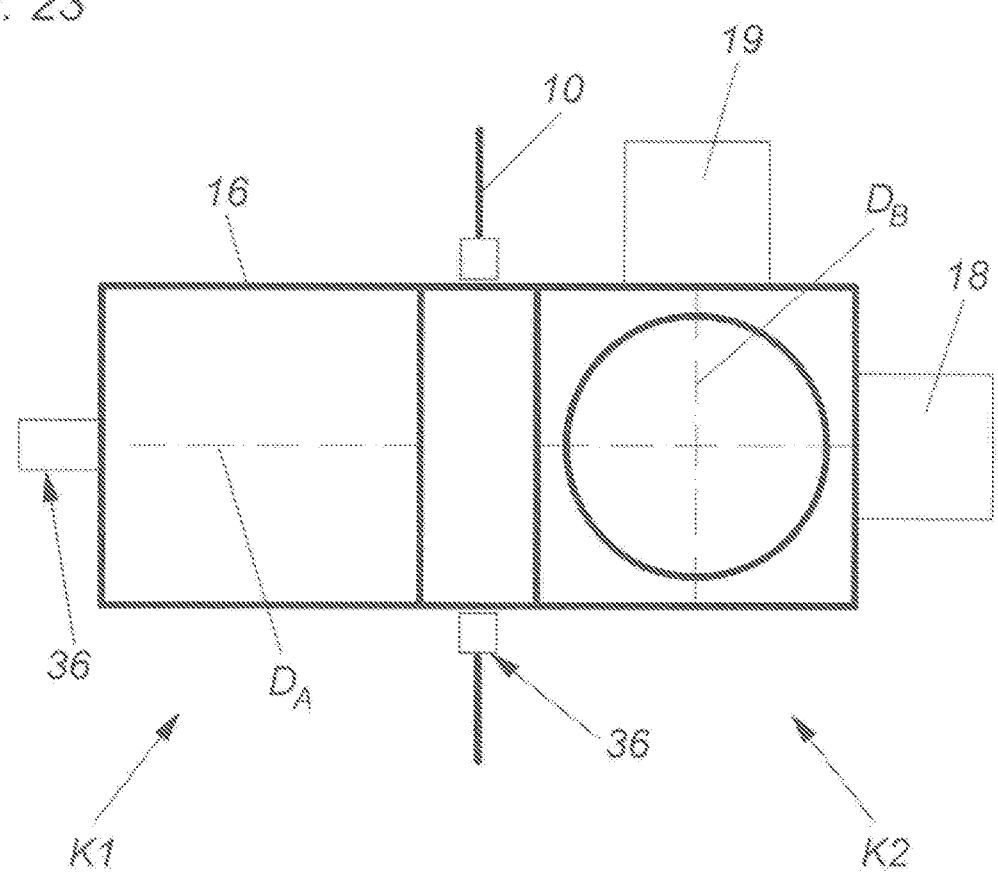

In FIG. 23, the outer ring 16 is integrally formed for both holding devices 4 and 5. The holding device 4 in the first chamber K1 does not have a separate second rotary axis $D_B$. That the second rotary axis $D_B$ is omitted can be the case for every embodiment.

Figure 24:
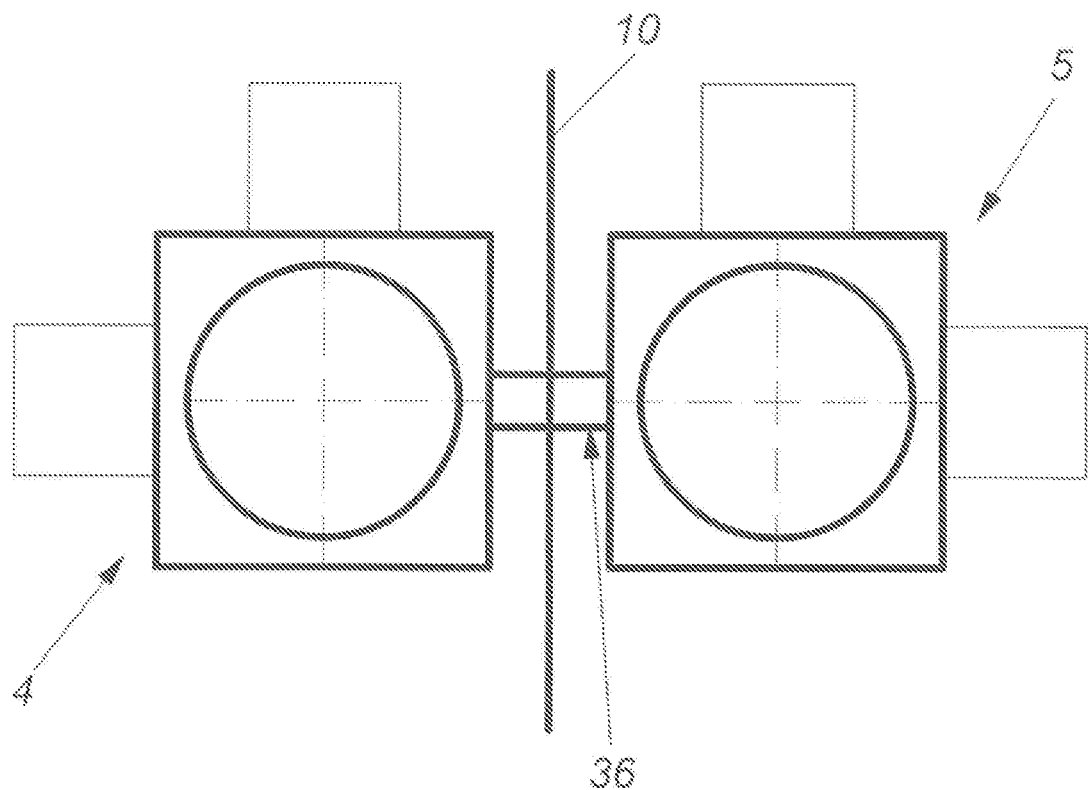

In FIG. 24, two completely separate holding devices 4 and 5 are shown which only have counter bearings on the partition wall 10. Thus, both areas can be controlled completely independent from each other.

Figure 25:
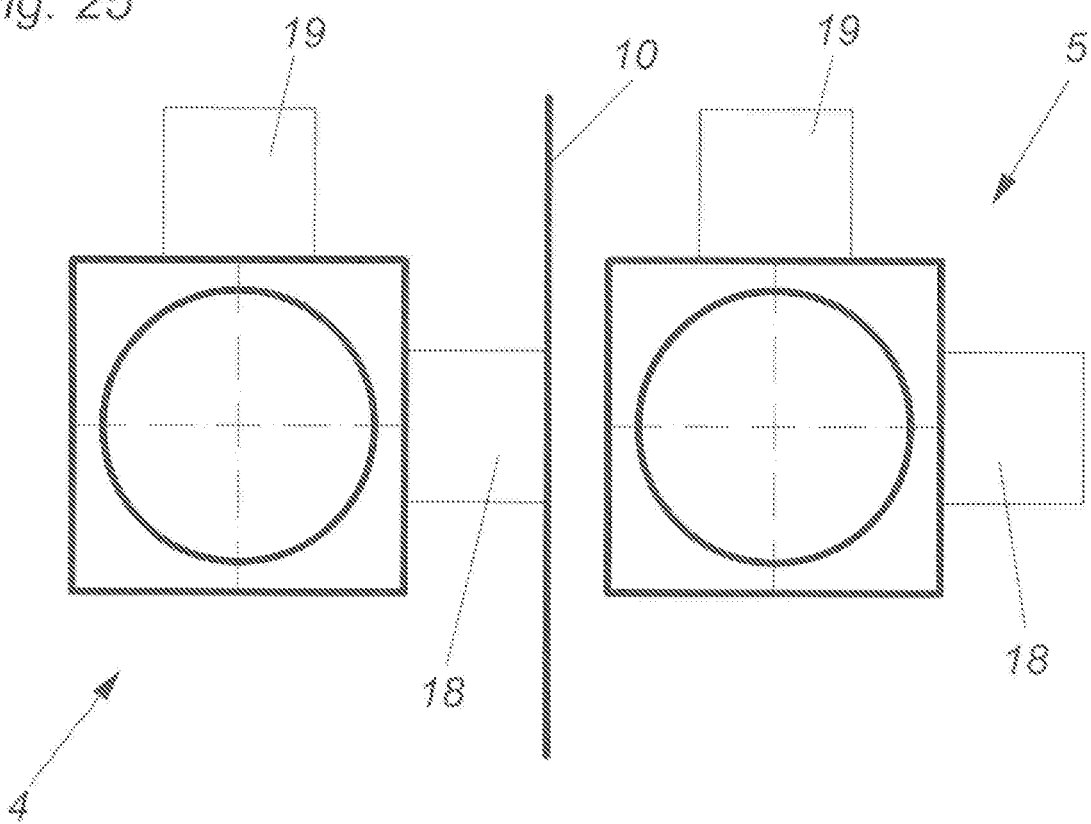

FIG. 25 shows an embodiment basically having the same configuration as shown in FIG. 24. In this case, however, only the drive devices 18 are positioned differently and no support bearings 36 are provided.

Figure 26:
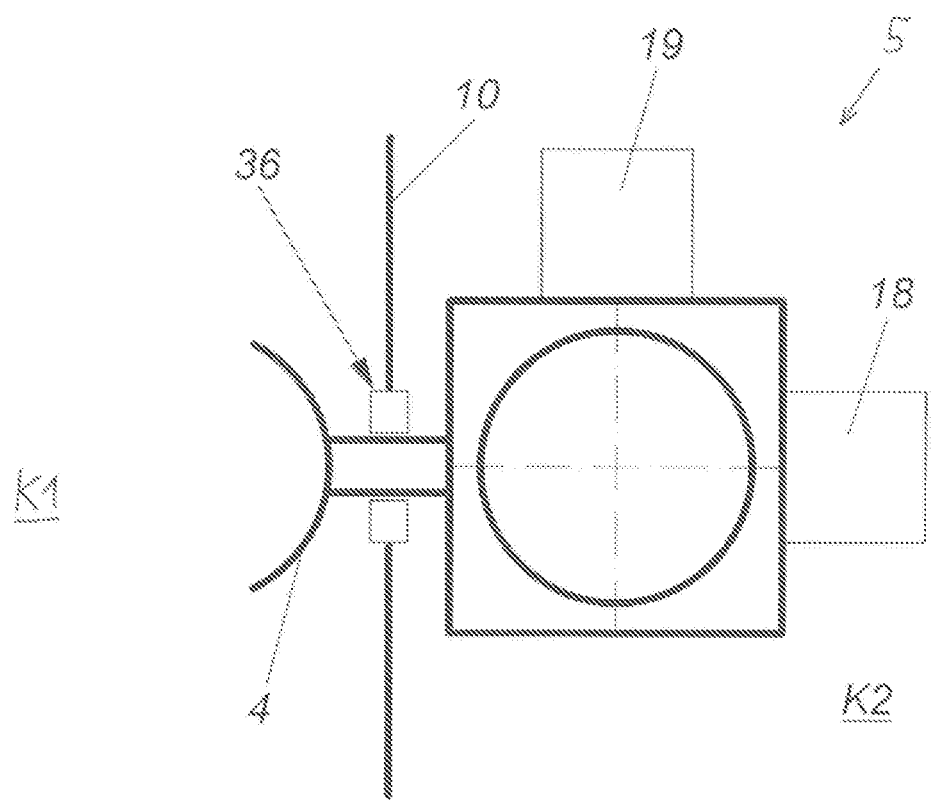

According to FIG. 26, only one holding device 4 for small blanks 2 is provided in the first chamber K1. This variant can be used when, for example, abutments are produced. Here, the blank 2 or the emerging workpiece W only has to be able to rotate.

Figure 27:
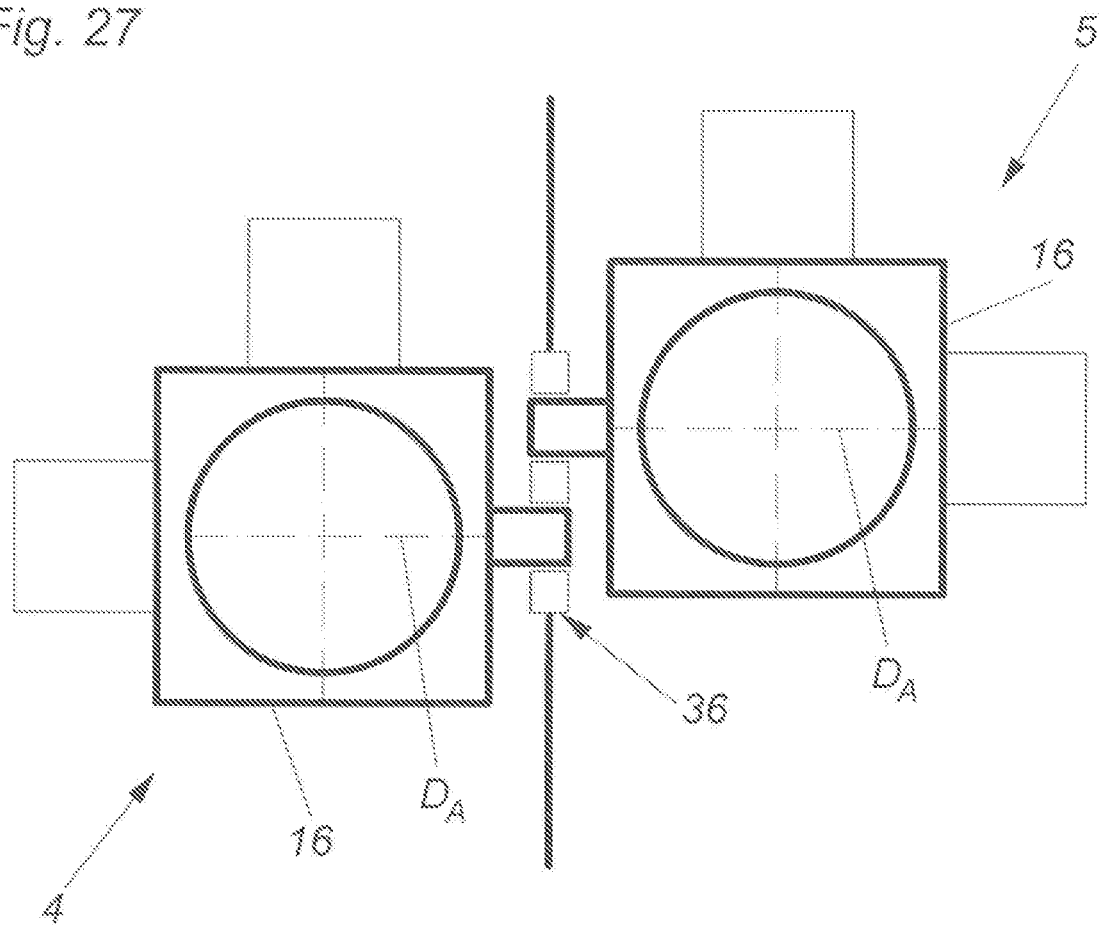

FIG. 27 should illustrate that the rotary axes $D_A$, as long as they are separate, do not have to be arranged in one line.

In FIG. 28, it is additionally envisaged for the shifting of the axes that the first holding device 4 is connected to the second holding device 5 via a transmission device. This transmission device can be formed by a belt drive or by gear wheels (reference sign 39). Thus, also different rotational speeds can be reached and, thereby, also different torques.

Instead of a single partition wall 10, two partition walls 10 can also be provided according to FIG. 29. A tool magazine 40 can be arranged between the partition walls 10, and the tool magazine 40 is then located in an area which is separated from dirt.

Figure 30:
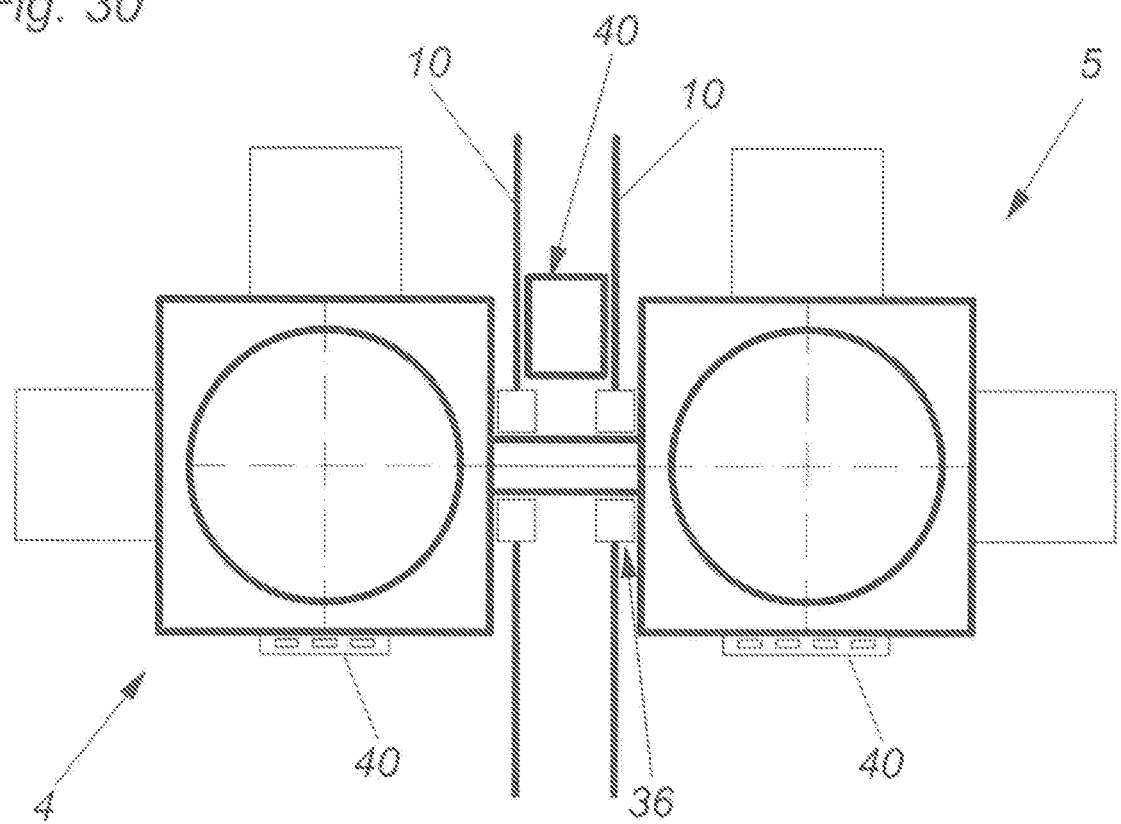

FIG. 30, as with FIG. 29, shows a double partition wall 10. However, the tool magazines 40 are also directly attached to the outer rings 16. If a double partition wall 10 is provided, then this double partition wall 10 ideally has a passing opening in both wall parts as long as the processing shaft 8 is not moving from the first to the second access opening (or vice versa) and the processing shaft 8 in this occasion also takes a processing tool in the area between the two wall parts.

Figure 31:
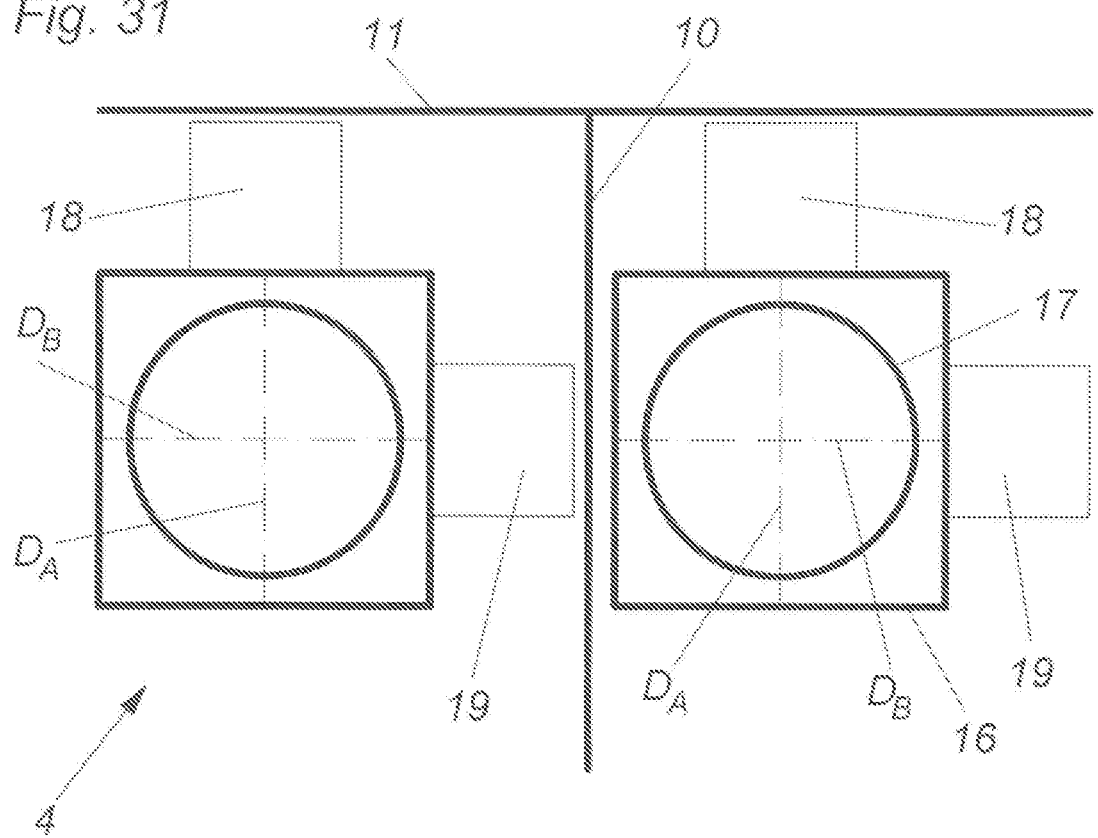

FIG. 31 again illustrates how the drive devices 18 and 19 can still be fixed in the processing machine 1. In the case of the variants described so far, the basic idea is established in such a way that the drive device 18 of the first rotary axis ($D_A$) is attached to a sidewall 33 of the processing machine 1 and then the drive device 19 of the second rotary axis ($D_B$) is attached to the rotating first part (outer ring 16) of the holding device 4 or 5. FIG. 31 illustrates that a reverse arrangement is also possible. Here, the drive device 18 of the rotary axis $D_A$ of the outer rings 16 is arranged on the limiting wall 11 of the processing machine. The drive device 19 of the rotary axis $D_B$ is mounted to the outer ring 16 and drives the inner ring 17. Thus, the two rotary axes $D_A$ and $D_B$ are oriented reverse to each other (or shifted by 90° each) compared to the previous embodiments. It can also be the case that one holding device 4 or 5 is formed according to the previous variants and the other holding device 5 or 4 is formed according to this variant of FIG. 31.

Finally, the advantages of the present invention are still quoted at a glance:
separate wet processing and dry processing is possible
only one open loop or closed loop control unit is necessary
at least two blanks can be autonomously processed after each other
the first rotary axis ($D_A$) can be moved for both holding devices (workpiece holders) with the same drive device cost-efficient, as only one processing device is necessary

LIST OF REFERENCE SIGNS 1 processing machine
2 blank
3 housing
4 first holding device
5 second holding device
6 processing device
7 drive device
8 processing shaft
9 processing tool
10 partition wall
11 limiting wall
12 closing mechanisms
13 frame
14 closing door
15 flexible wall element
15a folding bellow
15b sack element
16 outer ring
17 inner ring
18 drive device for the outer ring(s)
19 drive device for the inner ring(s)
20 open loop or closed loop control unit
21 memory
22 cover element
23 frame elements
24 floor plate
25 supporting feet
26 rear wall
27 rails
28 operating device
29 display device
30 input device
31 processor
32 passing opening
33 sidewalls
34 housing cover
35 closing element
36 support bearing
37 connecting element
38 coupling
39 belt drive or gear wheel
40 tool magazine
K1 first chamber
K2 second chamber
W dental workpiece
$B_{dry}$ processing area for dry processing
$B_{wet}$ processing area for wet processing
Z1 first access opening
Z2 second access opening
$D_A$ rotary axis of the outer rings
$D_B$ rotary axis of the inner rings
$D_C$ rotary axis of processing tool
BM processing mode
DS data record
X spatial axis
Y spatial axis
Z spatial axis

The invention claimed is:

1. A processing machine for producing a dental workpiece from a blank, the processing machine comprising:
   a housing in which a first chamber and a second chamber are arranged, the housing comprising a partition wall and a limiting wall separate from partition wall, the second chamber being separate from the first chamber by the partition wall,
   a rail on a side of the limiting wall remote from the partition wall,
   a first holding device for holding a blank, the first holding device being arranged in the first chamber and being movable relative to the housing,
   a second holding device for holding a blank, the second holding device being arranged in the second chamber and being movable relative to the housing, and
   a processing device movable relative to the housing, the processing device comprising a drive device movably supported on the rail,
   wherein the processing device is configured to process a blank held in the first holding device and a blank held in the second holding device.

2. The processing machine according to claim 1, wherein the processing machine comprises only one processing device.

3. The processing machine according to claim 1, wherein the processing device further comprises a processing shaft rotatably driven by the drive device, and a processing tool fixed in the processing shaft.

4. The processing machine according to claim 1, wherein the first chamber forms a processing area for dry processing of the blank to be held in the first holding device, and the second chamber forms a processing area for wet processing of the blank to be held in the second holding device.

5. The processing machine according to claim 1, wherein the limiting wall has a first access opening to the first chamber and a second access opening to the second chamber.

6. The processing machine according to claim 5, wherein the processing device is at least partly movable through at least one of the first access opening into the first chamber and (ii) the second access opening into the second chamber.

7. The processing machine according to claim 5, wherein the drive device of the processing device is linearly movably supported by the rail on the limiting wall.

8. The processing machine according to claim 5, wherein each of the first access opening and the second access opening is configured to be closed by a respective closing.

9. The processing machine according to claim 5, wherein the limiting wall is at least partly formed as a flexible and movable wall element.

10. The processing machine according to claim 8, wherein the closing mechanism of each of the first access opening and the second access opening is mounted to the limiting wall at least partly formed as a flexible and movable wall element.

11. The processing machine according to claim 1, further comprising an open loop or closed loop control unit for controlling or regulating the processing machine.

12. The processing machine according to claim 11, wherein the open loop or closed loop control unit has a memory having stored therein at least one data record, the at least one data record representing a dental workpiece, the open loop or closed loop control unit being configured such that, in a processing mode thereof, the processing device and the first holding device or the second holding device is controllable in such a way that the workpiece represented by the at least one data record can be processed from a blank held in the first holding device or in the second holding device.

13. A use of the processing machine according to claim 1 for the production of a dental workpiece from a blank.

14. The use according to claim 13, wherein blanks are alternatingly processed in the first chamber and in the second chamber by the processing device.

15. The processing machine according to claim 8, wherein each respective closing mechanism comprises a closing door movably supported on a frame.

16. The processing machine according to claim 9, wherein the flexible and movable wall element is a folding bellows or a sack element.

17. A processing machine for producing a dental workpiece from a blank, the processing machine comprising:
   a housing in which a first chamber and a second chamber are arranged, the housing comprising a partition wall and a limiting wall, the second chamber being separate from the first chamber by the partition wall, the limiting wall having a first access opening to the first chamber and a second access opening to the second chamber, each of the first access opening and the second access opening being configured to be closed by a respective closing mechanism,
   a first holding device for holding a blank, the first holding device being arranged in the first chamber and being movable relative to the housing,
   a second holding device for holding a blank, the second holding device being arranged in the second chamber and being movable relative to the housing, and
   a processing device movable relative to the housing,
   wherein the processing device is configured to process a blank held in the first holding device and a blank held in the second holding device.

18. The processing machine according to claim 17, wherein the processing device is at least partly movable through at least one of (i) the first access opening into the first chamber and (ii) the second access opening into the second chamber.

19. The processing machine according to claim 17, wherein the processing device includes a drive device linearly movably supported by a rail on the limiting wall.

20. The processing machine according to claim 17, wherein each respective closing mechanism comprises a closing door movably supported on a frame.

* * * * *